United States Patent
Akiyama

(10) Patent No.: US 8,352,700 B2
(45) Date of Patent: Jan. 8, 2013

(54) MEMORY MANAGEMENT PROGRAM AND APPARATUS

(75) Inventor: Akira Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 297 days.

(21) Appl. No.: 12/916,808

(22) Filed: Nov. 1, 2010

(65) Prior Publication Data
US 2011/0107038 A1  May 5, 2011

(30) Foreign Application Priority Data
Nov. 4, 2009 (JP) ................... 2009-253531

(51) Int. Cl.
*G06F 12/00* (2006.01)

(52) U.S. Cl. .................. 711/170; 711/154; 707/813

(58) Field of Classification Search .............. 711/154, 711/170; 707/813
See application file for complete search history.

(56) References Cited

U.S. PATENT DOCUMENTS
| 7,792,880 B2 * | 9/2010 | Arnold et al. ............... 707/817 |
| 2011/0119318 A1 * | 5/2011 | Daynes et al. ............... 707/816 |

FOREIGN PATENT DOCUMENTS
| JP | 59-158459 A | 9/1984 |
| JP | 5-20090 A | 1/1993 |

* cited by examiner

Primary Examiner — John Lane
(74) Attorney, Agent, or Firm — Fujitsu Patent Center

(57) ABSTRACT

A memory management apparatus includes: a memory space including a memory area serving as a heap area and a non-heap-area memory area; and memory management unit which add a header for an object to a memory area other than heap-area to treat the non-heap-area memory area as a mock object in order to treat a plurality of heap areas divided by the non-heap-area memory area as a single continuous heap area.

10 Claims, 22 Drawing Sheets

FIG. 13

| DATA NAME | USAGE |
|---|---|
| want_size | SIZE OF HEAP AREA THAT IS DESIRED TO BE NEWLY ACQUIRED BUT THAT HAS NOT BEEN ACQUIRED YET<br>E.G. WHEN AREA WITH SIZE 60 IS DESIRED TO BE ADDITIONALLY ACQUIRED, want_size IS INITIALLY 60.<br>AFTER AREA WITH SIZE 30 IS ACQUIRED, want_size IS 30.<br>WHEN want_size IS 0 OR LESS, AREA WITH SIZE 60 HAS BEEN ACQUIRED. |
| start_addr | INITIAL ADDRESS OF HEAP AREA DESIRED TO BE ACQUIRED. WHEN start_addr is 0, HEAP AREA MAY BE ACQUIRED FROM ANY ADDRESS. |
| attempt_size | SIZE OF HEAP AREA THAT IT IS ACTUALLY ATTEMPTED TO ACQUIRE FROM VIRTUAL MEMORY SPACE |
| align_size | ALIGNMENT SIZE AT THE TIME OF HEAP AREA ACQUISITION. attempt_size IS ADJUSTED IN ACCORDANCE WITH align_size. |
| limit_addr | LIMIT OF ADDRESS OF HEAP AREA THAT CAN BE ACQUIRED FROM VIRTUAL MEMORY SPACE |
| om_bottom | INITIAL ADDRESS OF "NON-HEAP-AREA MEMORY AREA" CONTIGUOUS TO HEAP AREA |
| om_size | SIZE OF "NON-HEAP-AREA MEMORY AREA" CONTIGUOUS TO HEAP AREA |

MEMORY MANAGEMENT PROGRAM AND APPARATUS

CROSS-REFERENCE TO RELATED APPLICATIONS

This application is based upon and claims the benefit of priority of the prior Japanese Patent Application No. 2009-253531, filed on Nov. 4, 2009, the entire contents of which are incorporated herein by reference.

FIELD

The embodiments discussed herein are related to a memory management program and a memory management apparatus.

BACKGROUND

A java virtual machine (JVM) has garbage collection (hereinafter simply referred to as "GC") as a memory management function. GC is utilized in the related art (see Japanese Laid-open Patent Publication No. 59-158459, for example).

GC is a function of automatically releasing a portion of a memory area (hereinafter referred to as an "object") dynamically allocated by application software that is not used any more. In this event, objects being used are rearranged to be continuous in order to create a continuous unused area on a heap area (while this process is occasionally specifically referred to as "compaction" for differentiation, this process is also included in GC herein). In addition to the JVM, C# Common Language Runtime (CLR) also has GC, for example. GC is thus widely employed.

In a process (such as a virtual machine) implementing a memory management function through GC, in the case where application software provides a dynamic object generation request, objects are allocated to a heap area in a virtual memory space 50 of the process. GC automatically releases an object determined to be unnecessary, of the objects dynamically allocated on the heap area by the application software. In general, there are various types of heap areas according to their usage. Herein, the term "heap area" refers to a memory area to which a group of objects as possible targets of GC are to be allocated.

As objects are repeatedly generated along with execution of the application software, the heap area is gradually filled up, which leads to a deficient free capacity not allowing generation new objects. When no more new objects can be generated, GC is executed. GC frees objects that are not used by the application software and thus are determined to be unnecessary. GC thus secures a free capacity for allocation of new objects.

In one scheme of GC, a continuous area in a virtual memory space 50 is acquired/managed as a heap area in order to increase the processing speed (improve the efficiency of sequential examination of objects in the heap area, improve the cache efficiency). Transitions between object allocation states on a continuous heap area 130 will be described briefly below.

FIG. 1 illustrates an exemplary object allocation state on a continuous heap area 130. Objects 100, for which dynamic generation requests are provided from application software, are allocated to be continuous on a heap area. The objects 100 are allocated sequentially in the direction from a lower address toward a higher address of the heap area.

FIG. 2 illustrates an exemplary state in which a free area 120 on the continuous heap area 130 is deficient. As objects are repeatedly generated, the heap area is filled up with an object-allocated area 110. The free capacity in the heap area is deficient, which does not allow generation new objects. GC is executed when the state of FIG. 2 occurs.

FIG. 3 illustrates an exemplary state immediately after execution of GC on the continuous heap area 130. GC releases objects determined to be unnecessary. Meanwhile, GC leaves objects determined as being used 105 (hereinafter referred to as "surviving objects") in the heap area. The surviving objects 105 are collected on the lower address side of the heap area. A free area 120 for allocation of new objects is secured on the higher address side of the heap area.

In the case where a large number of surviving objects 105 remain in the heap area even after execution of GC, which prevents securing of a free area 120, an out-of-memory error is triggered.

In the above scheme of GC, a continuous memory area in a virtual memory space 50 of a process is allocated as a heap area. However, a memory area usable as a heap area may be divided to be fragmented under the influence of an area (hereinafter referred to as "non-heap-area memory area 63") that is used for purposes other than as a heap area such as library mapping. If a memory area usable as a heap area is fragmented, the size of an area that may be treated as one continuous heap area 130 is reduced.

FIG. 4 illustrates an exemplary memory area usable as a heap area fragmented under the influence of a non-heap-area memory area 63. In the example of FIG. 4, a "non-heap-area memory area 63" is provided between a "continuous area 1 usable as heap area 140" and a "continuous area 2 usable as heap area 160".

The presence of the "non-heap-area memory area 63" permits only one of the "continuous area 1 usable as heap area 140" and the "continuous area 2 usable as heap area 160" to be treated as a heap area. As a result, the "continuous area 1 usable as heap area 140" and the "continuous area 2 usable as heap area 160" cannot be treated as a continuous area.

There has conventionally been a scheme of GC in which a heap area is acquired from divided memory areas and not from a continuous memory area. In the scheme of GC in which a heap area is acquired from divided memory areas, divided discontinuous memory areas are used as a heap area, and therefore the heap area can be additionally acquired irrespective of the presence of a non-heap-area memory area 63.

However, the scheme of GC in which a heap area is acquired from divided memory areas and not from a continuous memory area is significantly affected by the following drawbacks, and is currently rarely used.

In the scheme of GC in which a heap area is acquired from divided memory areas and not from a continuous memory area, the heap area is virtually treated as a continuous area by using an address management table. Therefore, in order to access each object, it is necessary to calculate the actual address of the object by way of the address management table, which significantly affects the performance. In the scheme of GC in which a heap area is acquired from a continuous memory area, for example, objects are accessed using their actual addresses, not by way of an address management table, which results in fast processing.

In addition, the scheme of GC in which a heap area is acquired from divided memory areas and not from a continuous memory area requires an extra memory area for the address management table.

SUMMARY

According to an aspect of the invention, a memory management apparatus includes: a memory including a memory area serving as a heap area and a non-heap-area memory area 63; and a processor which adds a header for an object to a memory area other than heap-area to treat the non-heap-area memory area 63 as a mock object in order to treat a plurality of heap areas divided by the non-heap-area memory area 63 as a single continuous heap area.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating exemplary GC-target heap area management data;

DESCRIPTION OF EMBODIMENTS

An embodiment of the present invention will be described below with reference to the drawings.

Figure 5:
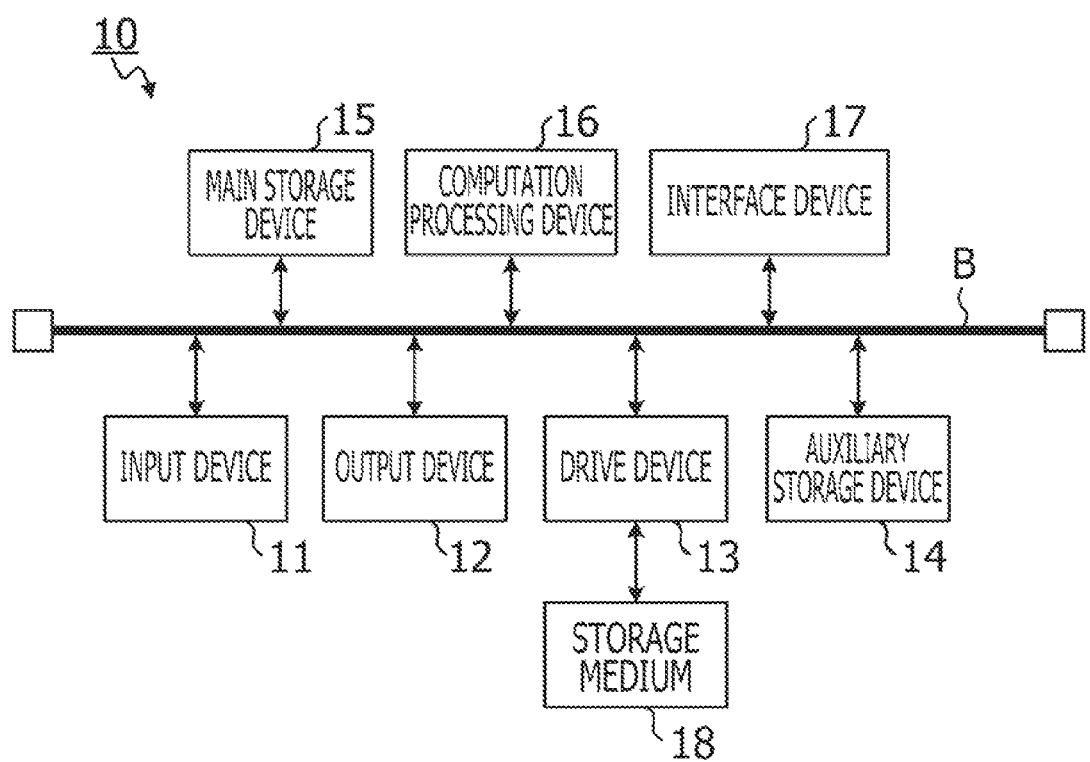
FIG. 5 is a diagram illustrating an exemplary hardware configuration of an apparatus having a memory management function.

FIG. 5 is a diagram illustrating an exemplary hardware configuration of an apparatus having a memory management function. An apparatus 10 having a memory management function of FIG. 5 includes an input device 11, an output device 12, a drive device 13, an auxiliary storage device 14, a main storage device 15, a computation processing device 16, and an interface device 17, which are connected to each other through a bus B. The hardware configuration diagram of FIG. 5 does not indicate that the input device 11, the output device 12, the drive device 13, the auxiliary storage device 14, the main storage device 15, the computation processing device 16, and the interface device 17 are provided in a single housing, and they may be provided separately in a plurality of housings.

The input device 11 may be a keyboard, a mouse, or the like. The input device 11 is used to input various signals. The output device 12 may be a display device or the like. The output device 12 is used to display various windows, data, and so forth. The interface device 17 may be a model, a LAN card, or the like. The interface device 17 is used to connect to a network. That is, the interface device 17 is used if a connection to a network is to be made.

A program having the memory management function according to the embodiment is at least a part of various programs for controlling the apparatus 10. The program having the memory management function is provided through distribution of a storage medium 18 or downloading from a network, for example. The storage medium 18 storing the program may be various types of storage media such as storage media that store information optically, electrically, or magnetically such as a compact disc read-only memory (CD-ROM), a flexible disk, and a magneto-optical disk and semiconductor memories that store information electrically such as a ROM and a flash memory.

When the storage medium 18 storing the program is set on the drive device 13, the program is installed on the auxiliary storage device 14 from the storage medium 18 via the drive device 13. If downloaded from a network, the program is installed on the auxiliary storage device 14 via the interface device 17.

The auxiliary storage device 14 stores the installed program, and stores necessary files, data, and so forth. The main storage device 15 reads the program from the auxiliary storage device 14 to store the program when starting up the program. The computation processing device 16 performs various processes to be discussed later in accordance with the program stored in the main storage device 15.

Figure 6:
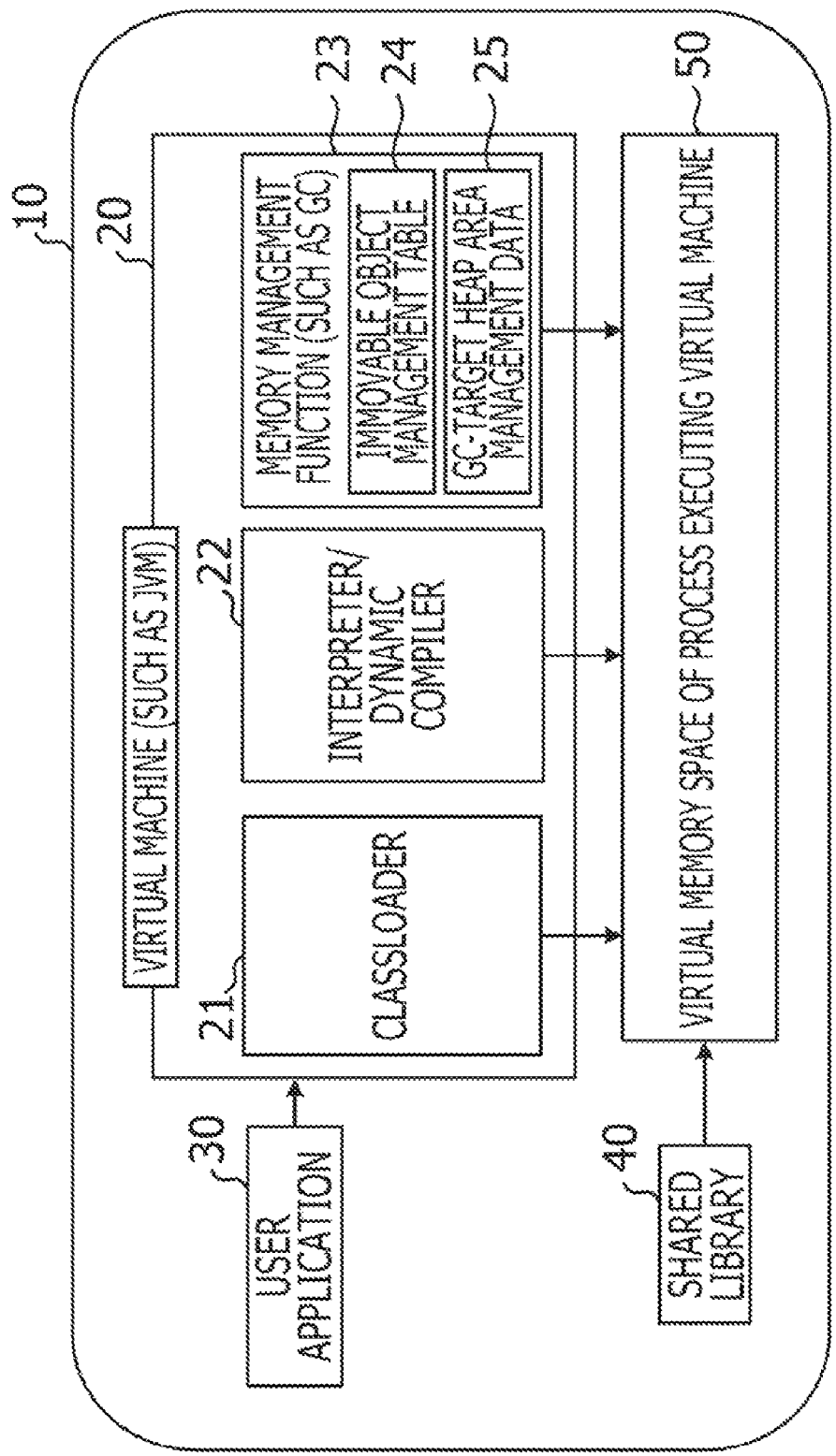
FIG. 6 is a diagram illustrating an exemplary software configuration of the apparatus having the memory management function.

FIG. 6 is a diagram illustrating an exemplary software configuration of the apparatus having the memory management function. FIG. 6 illustrates the software configuration during execution of a JVM as an example. A virtual machine 20 is an example of a process implementing the memory management function according to the embodiment.

In the apparatus of FIG. 6, an operating system (OS) (not shown) operates on the hardware, the virtual machine 20 operates on the OS, a user application 30 operates on the virtual machine 20, and a shared library 40 is loaded into a virtual memory space 50 of a process executing the virtual machine 20. A classloader 21, an interpreter/dynamic compiler 22, and a memory management function 23 operate on the virtual machine 20. The memory management function 23 includes an immovable object management table 24 and a GC-target heap area management data 25 to be discussed later.

Figure 7:
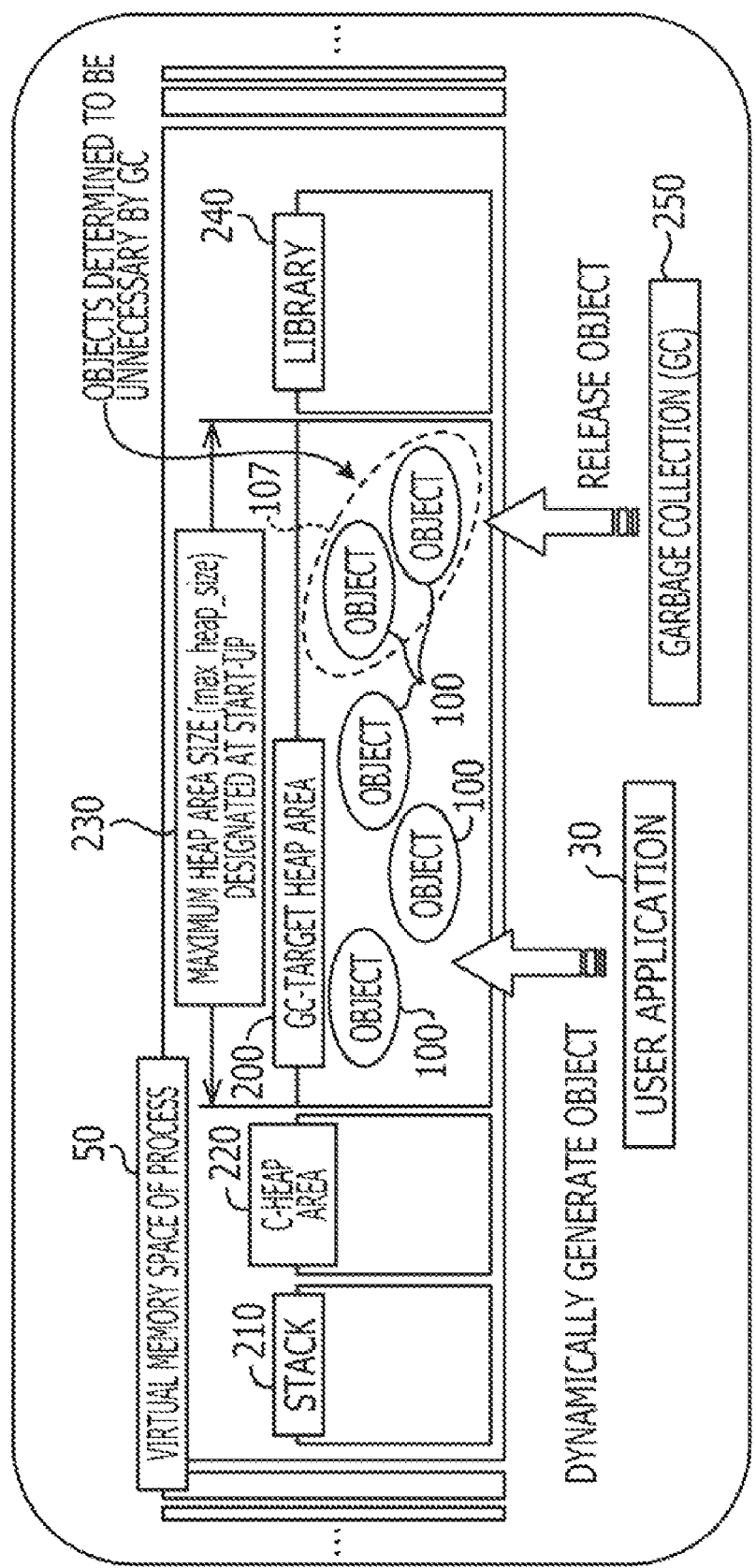
FIG. 7 is a schematic diagram illustrating a virtual memory space 50 of a process executing a virtual machine.

FIG. 7 is a schematic diagram illustrating a virtual memory space 50 of a process executing a virtual machine. A heap area with a maximum size designated at start-up is secured in the virtual memory space 50 of the process executing the virtual machine 20. The heap area is the target of GC. The user application 30 generates an object 100 in the GC-target heap area 200 by way of the virtual machine 20. The memory management function 23 releases objects 107 determined to be unnecessary by GC. An area (non-heap-area memory area 63) that is used for purposes other than as a heap area such as mapping of the shared library 40 is also allocated in the virtual memory space 50 of the process executing the virtual machine 20.

Figure 1:
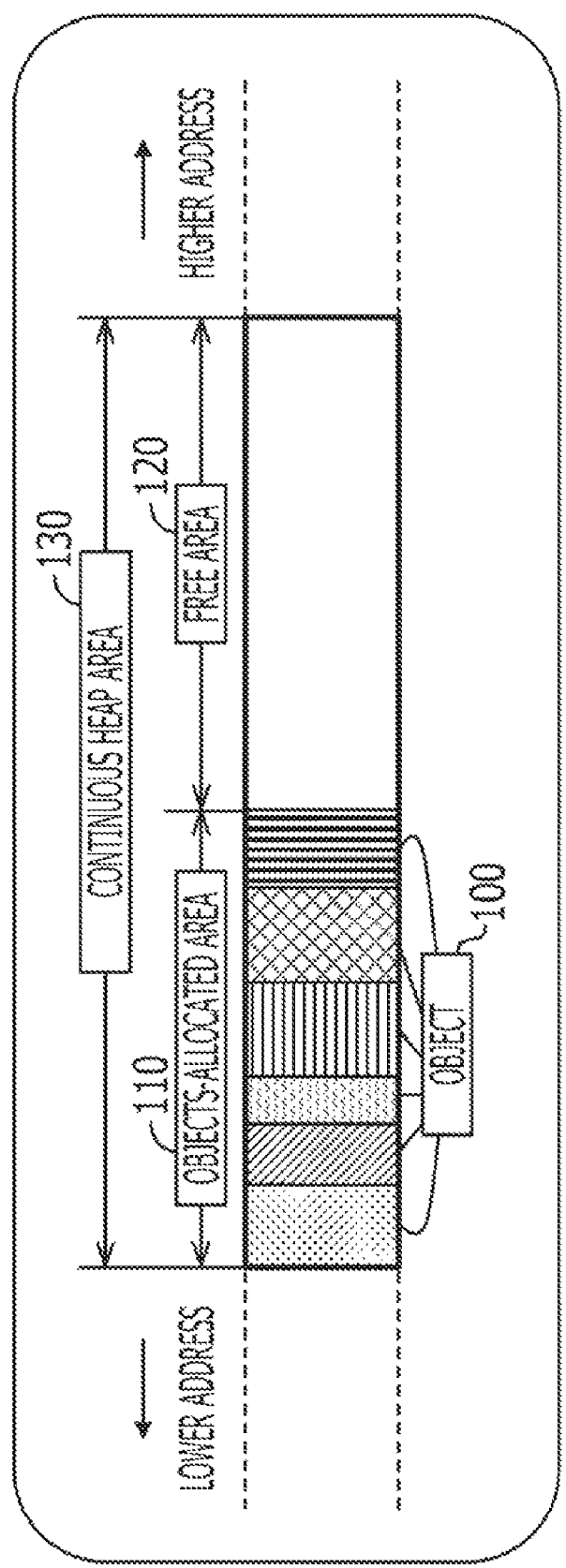
FIG. 1 illustrates an exemplary object allocation state on a continuous heap area 130.
Figure 2:
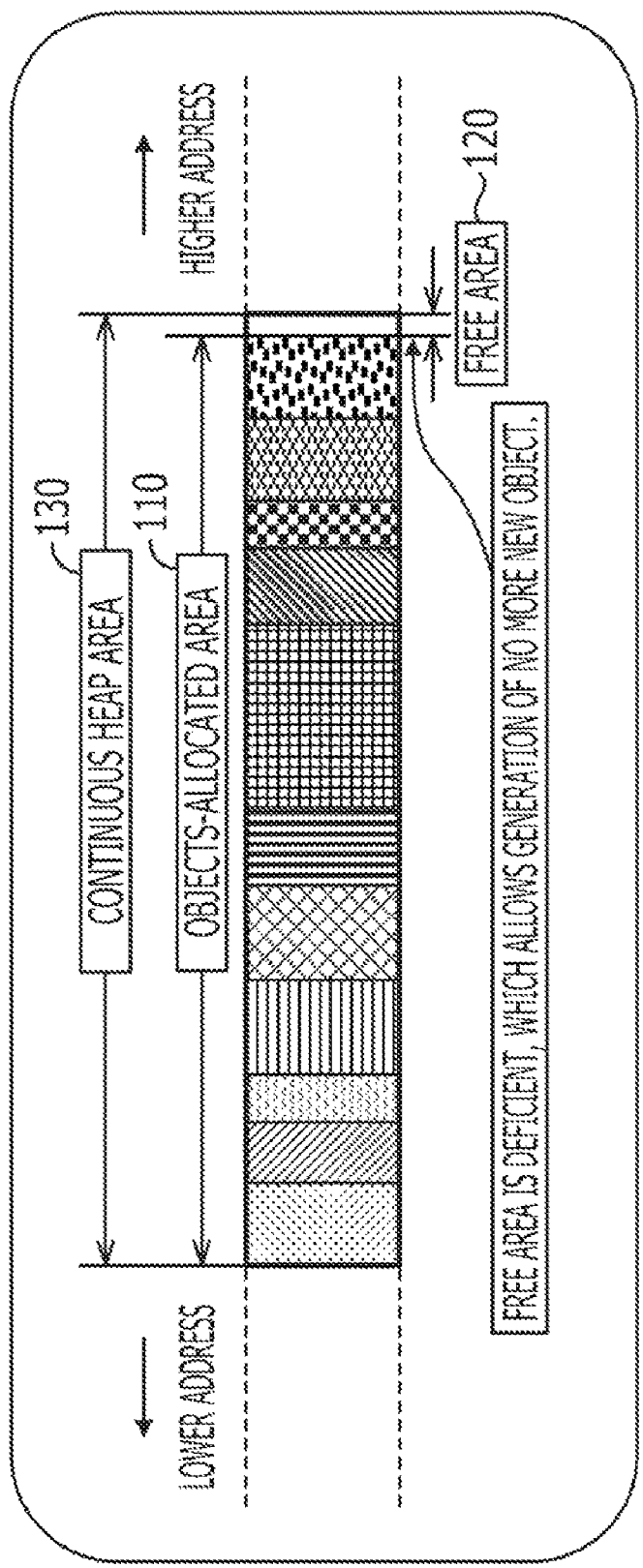
FIG. 2 illustrates an exemplary state in which a free area 120 on the continuous heap area 130 is deficient.
Figure 3:
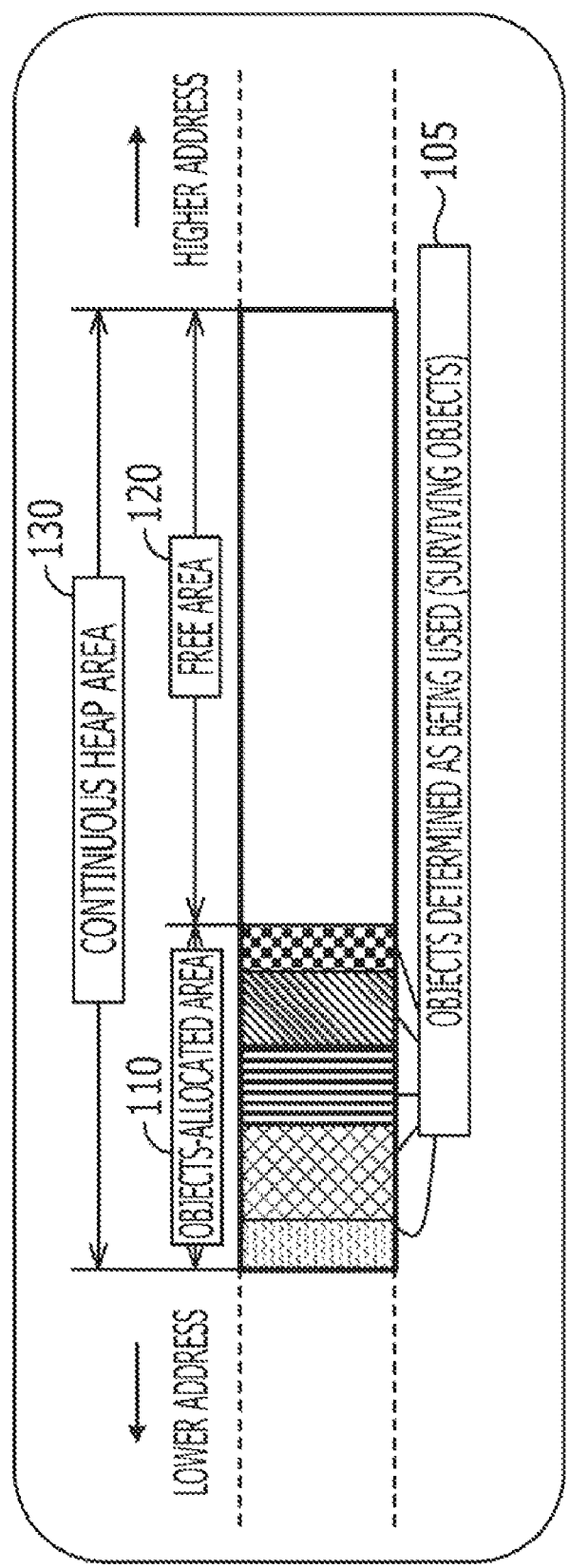
FIG. 3 illustrates an exemplary state immediately after execution of GC on the continuous heap area 130.
Figure 4:
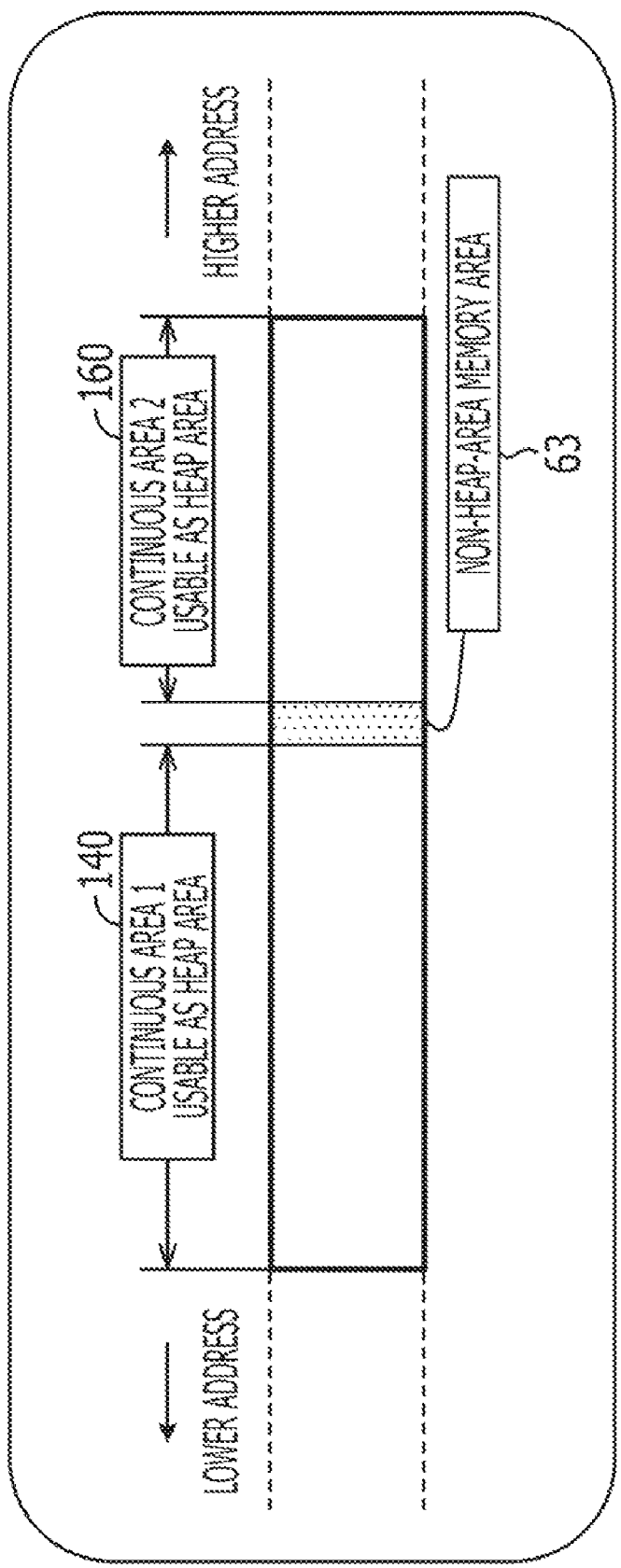
FIG. 4 illustrates an exemplary memory area usable as a heap area fragmented under the influence of a non-heap-area memory area 63.

In the case where a "non-heap-area memory area 63" is allocated as illustrated in FIG. 4, a continuous area usable as a heap area is divided into a "continuous area 1 usable as heap area 140" and a "continuous area 2 usable as heap area 160". As a result, only one of the "continuous area 1 usable as heap area 140" and the "continuous area 2 usable as heap area 160" can be treated as a heap area.

Figure 8:
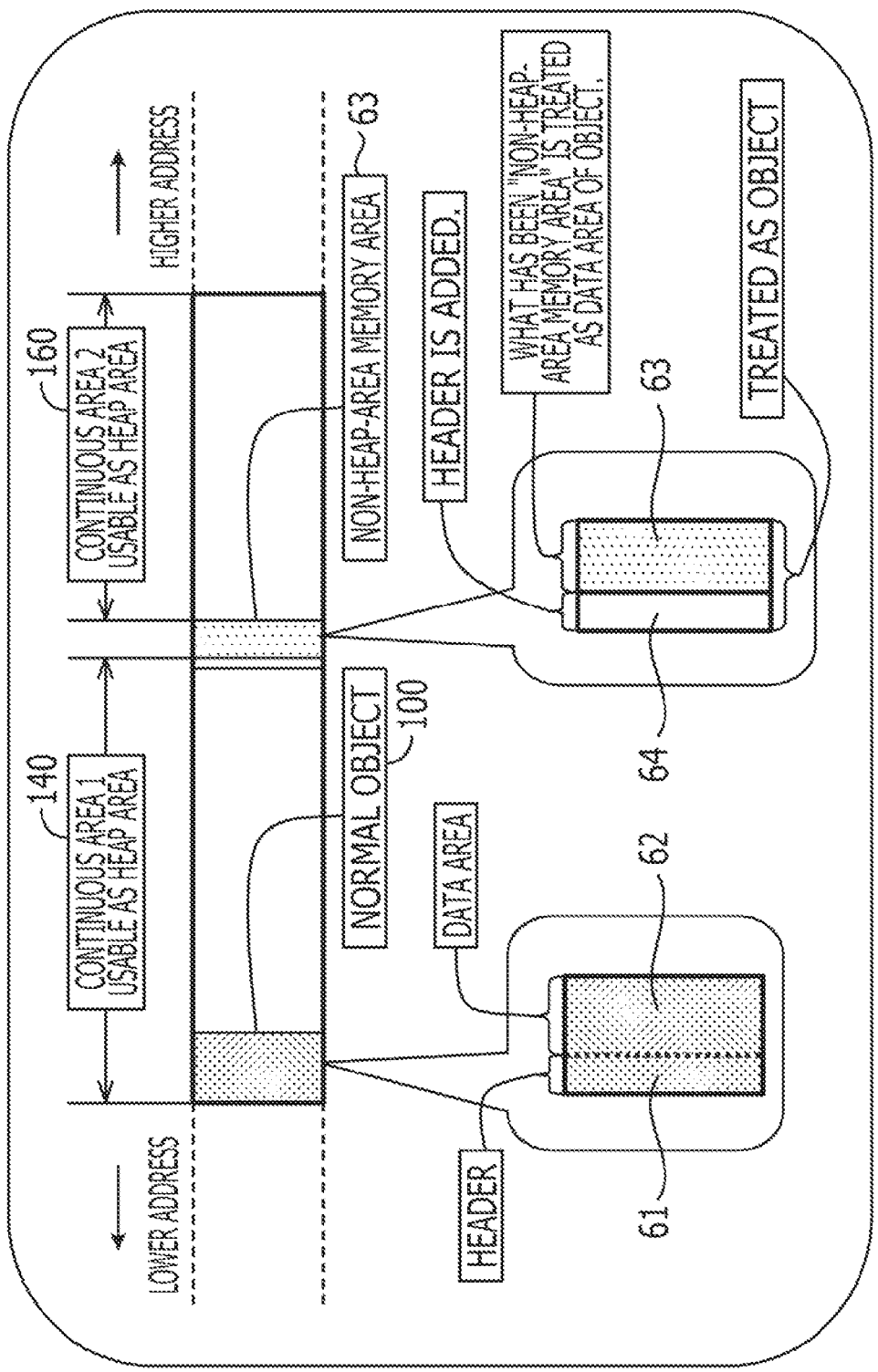
FIG. 8 illustrates an exemplary method of treating a non-heap-area memory area 63 as an object.

Thus, in the embodiment, the non-heap-area memory area 63 is treated as a single object (mock object) as illustrated in FIG. 8 to allow the non-heap-area memory area 63 to be stored in a heap area.

FIG. 8 illustrates an exemplary method of treating a non-heap-area memory area 63 as an object. By treating the non-heap-area memory area 63 as a single object, the "continuous area 1 usable as heap area 140" and the "continuous area 2 usable as heap area 160" can be used as a single continuous heap area 130. The statuses of the "non-heap-area memory area 63" and the free area 120 are checked using a system function (if the executive system is Windows® (registered trademark), VirtualQuery( ) is used, for example).

A normal object 100 generated by the user application 30 includes a header 61 and a data area 62. The header 61 includes class information, size information, information for reference from the outside (which may be collectively managed in a separate location depending on the system), and so forth. In order to treat a non-heap-area memory area 63 as an object, a header 64 is added to the non-heap-area memory area 63 as with the normal object. The non-heap-area memory area 63 is then treated as a data area. In the method illustrated in FIG. 8, it is necessary to secure an area for use as a header at the current terminal end of the heap area at all times. However, such an area for use as a header to be secured takes only about a dozen or so bytes, and thus rarely affects the execution of the user application 30.

Figure 9:
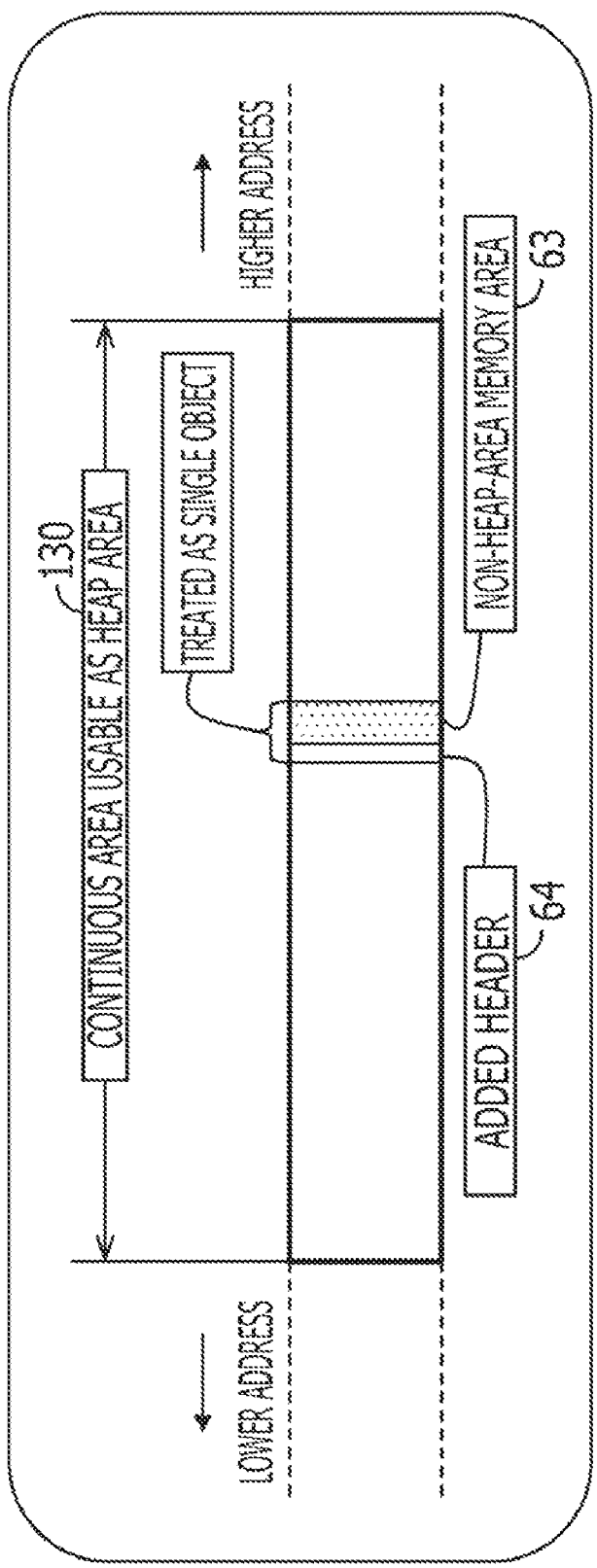
FIG. 9 illustrates an exemplary state in which a non-heap-area memory area 63 is treated as an object.

FIG. 9 illustrates an exemplary state in which a non-heap-area memory area 63 is treated as an object. The memory management function 23 recognizes the non-heap-area memory area 63 as a single object.

As a result, a single larger "continuous area usable as heap area" can be acquired when the memory management function 23 treats two "continuous areas usable as heap areas" divided by a "non-heap-area memory area 63" as a single "continuous area usable as heap area".

In the case where the size of a heap area designated at process start-up is too small, a free area 120 may not be secured in the heap area even after execution of GC, which may trigger an out-of-memory error to lead to a system halt. Such an out-of-memory error can be avoided if an additional continuous area can be acquired during execution of the process.

Figure 10:
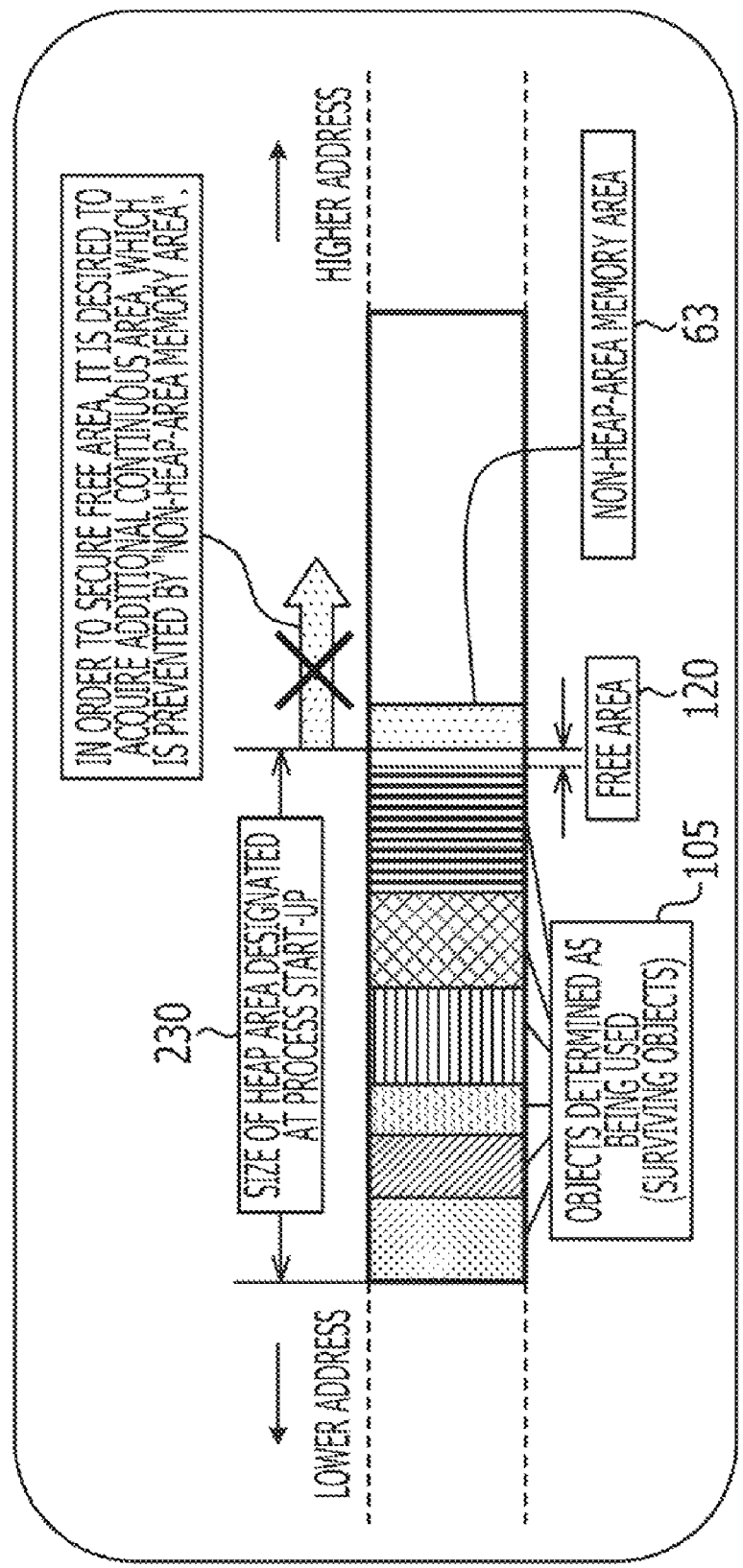
FIG. 10 illustrates an exemplary state in which no additional continuous area can be acquired during execution of the process.

In the case where a "non-heap-area memory area 63" is contiguous with a heap area as shown in FIG. 10, however, no additional continuous area can be acquired during execution of the process. FIG. 10 illustrates an exemplary state in which no additional continuous area can be acquired during execution of the process.

In FIG. 10, a non-heap-area memory area 63 is allocated to be contiguous with a heap area acquired at process start-up. In FIG. 10, a large number of surviving objects 105 remain in the heap area even after execution of GC, which prevents securing of a free area 120. Thus, while it is desirable to acquire an additional continuous area during execution of the process, no additional continuous area may be acquired during execution of the process in the example of FIG. 10, since a non-heap-area memory area 63 is allocated to be contiguous with a heap area acquired at process start-up.

Consequently, in the related art, it is necessary to stop the process and restart the process with the size of the heap area redesignated. In the embodiment, on the other hand, an additional continuous area can be acquired during execution of the process by treating a "non-heap-area memory area 63" that is contiguous with a heap area acquired at process start-up as an object. According to the embodiment, it is possible to add a continuous area to a heap area (expand a heap area) without stopping the process.

In the case where a heap area is expanded without stopping the process, the size of the heap area after the expansion may be determined by taking statistics of the memory use status from process start-up to the present to calculate an optimum size after the expansion, or by allowing a user to designate an allowable value in advance.

In the case where a non-heap-area memory area 63 is treated as an object, the memory management function 23, which performs heap area management such as GC, assumes the non-heap-area memory area 63 serving as a mock object as a single surviving object. However, the non-heap-area memory area 63 serving as a mock object is originally an area used for library mapping or the like, and thus may be accessed from another function.

Figure 11:
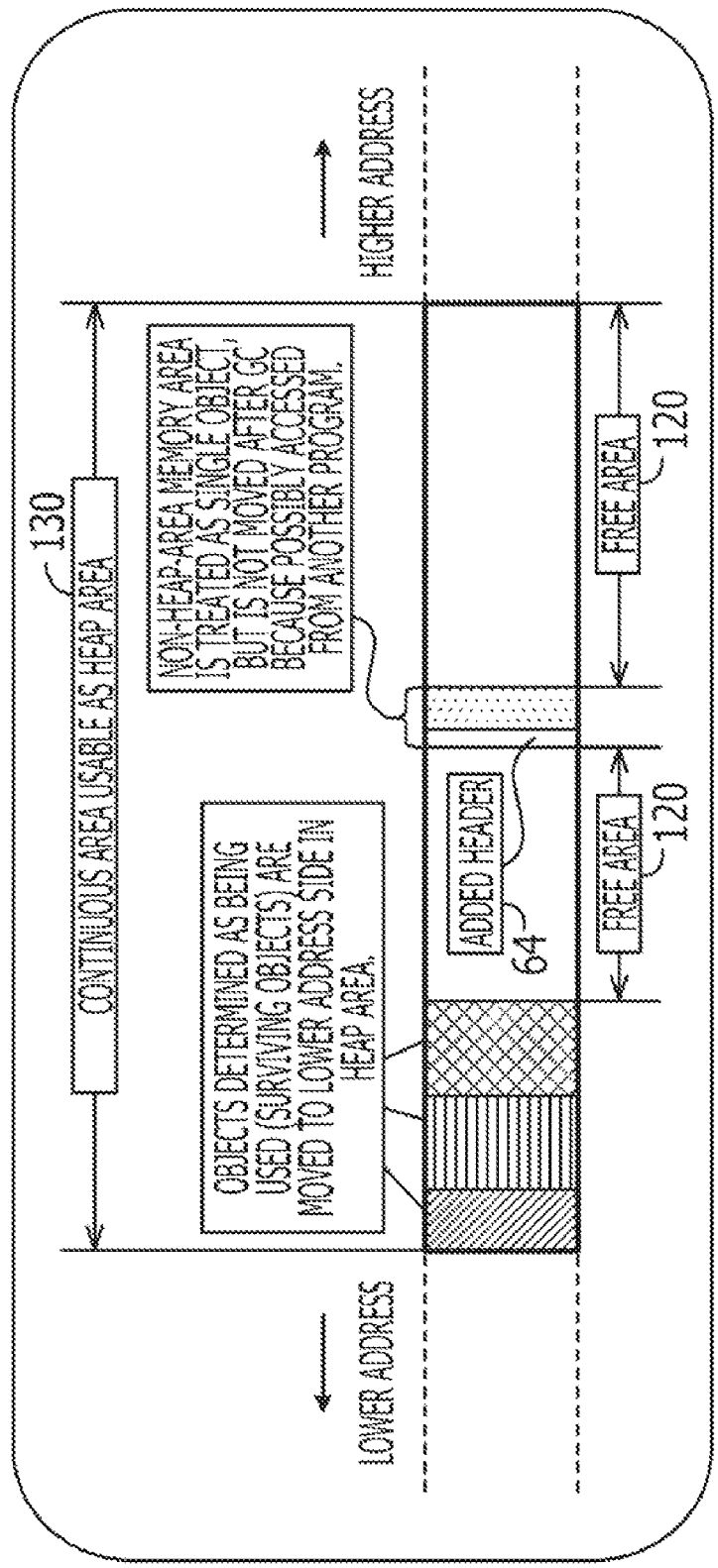
FIG. 11 illustrates an exemplary state in which a non-heap-area memory area 63 serving as a mock object is not moved even after execution of GC.

Therefore, a non-heap-area memory area 63 serving as a mock object should remain as a surviving object, and should be treated as an object that is not moved even after execution of GC, unlike normal objects. FIG. 11 illustrates an exemplary state in which a non-heap-area memory area 63 serving as a mock object is not moved even after execution of GC.

Figure 12:
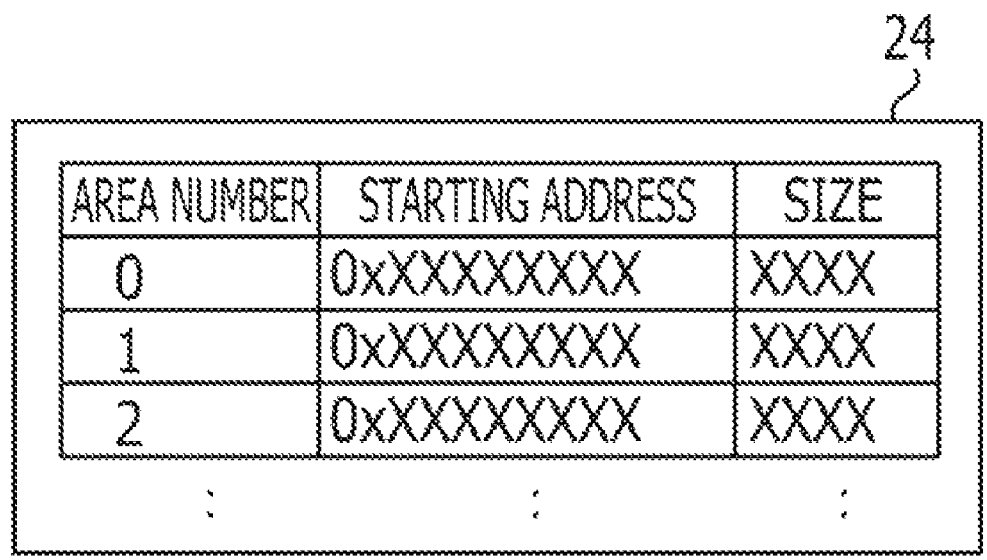
FIG. 12 is a diagram illustrating an exemplary immovable object management table.

There may be a plurality of non-heap-area memory areas 63 to be treated as objects, in which case the immovable object management table 24 illustrated in FIG. 12 is used for management. FIG. 12 is a diagram illustrating an exemplary immovable object management table 24. The immovable object management table 24 includes an area number, a starting address, and a size as data items.

The area number is used to identify non-heap-area memory areas to be treated as objects. The starting address indicates the starting address of a non-heap-area memory area 63 to be treated as a mock object. The size indicates the size of a memory area to be treated as a mock object. The immovable object management table 24 is included in the memory management function 23.

As discussed earlier, the memory management function 23 includes the GC-target heap area management data 25 in addition to the immovable object management table 24. FIG. 13 is a diagram illustrating exemplary GC-target heap area management data 25. The GC-target heap area management data 25 include a name and a usage of data (variables) used in flowcharts to be discussed later. Each of the data will be discussed in detail later.

The memory management function according to the embodiment will be described below with reference to the flowcharts. First, in order to facilitate understanding of the memory management function according to the embodiment, a process according to the related art will be described.

Figure 14:
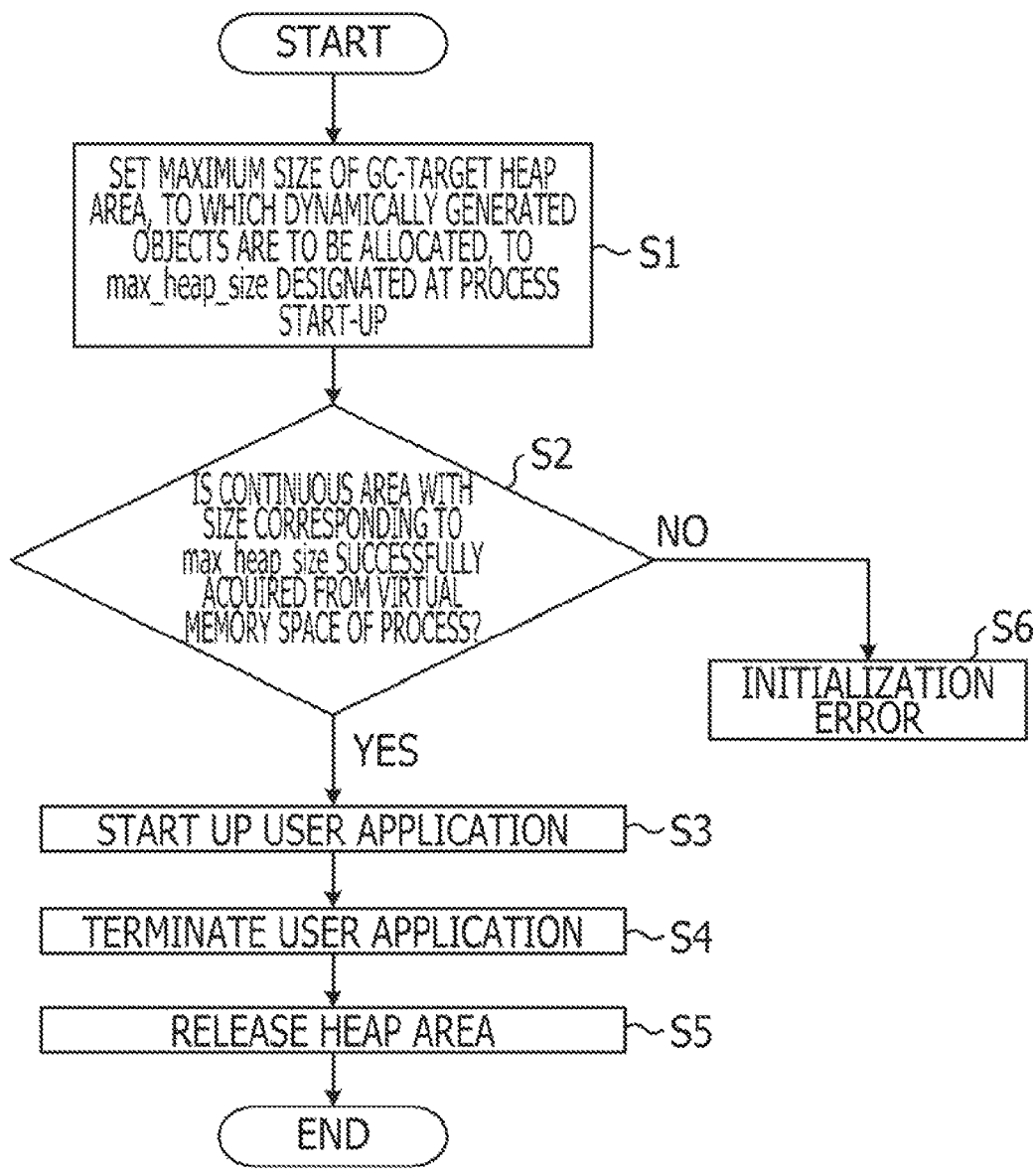
FIG. 14 is a flowchart illustrating an exemplary process of acquiring/releasing a heap area according to the related art.

FIG. 14 is a flowchart illustrating an exemplary process of acquiring/releasing a heap area according to the related art. In step S1, the memory management function 23 sets the maximum size of a GC-target heap area 200 in the virtual memory space 50, to which objects are to be allocated, to a maximum heap area size (max_heap_size) 230 designated at process start-up.

In step S2, the memory management function 23 attempts to acquire a continuous area with the maximum heap area size 230 from the virtual memory space 50 of the process. If a continuous area with the maximum heap area size 230 is acquired from the virtual memory space 50 of the process, the memory management function 23 proceeds to step S3. If a continuous area with the maximum heap area size 230 is not acquired from the virtual memory space 50 of the process, the memory management function 23 proceeds to step S6, and triggers an initialization error.

In step S3, the user application 30 is started up. The user application 30 generates objects in the GC-target heap area 200. In step S4, the user application 30 is terminated. In step S5, the continuous area with the maximum heap area size 230 acquired from the virtual memory space 50 of the process in step S2 is released.

Figure 15:
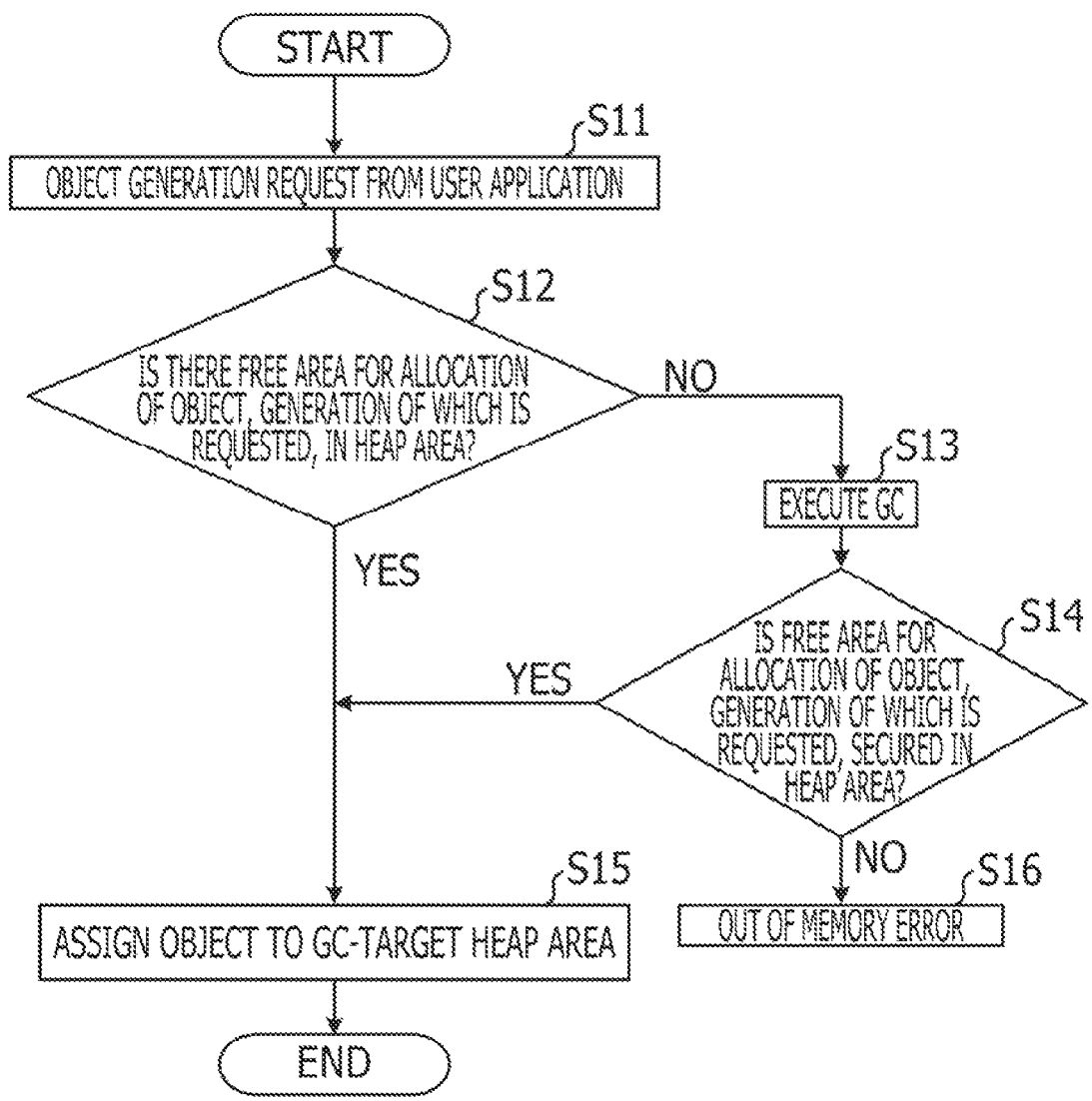
FIG. 15 is a flowchart illustrating an exemplary process of an object generation request for a heap area according to the related art.

FIG. 15 is a flowchart illustrating an exemplary process for an object generation request for a heap area according to the related art. In step S11, the memory management function 23 receives an object generation request from the user application 30.

In step S12, the memory management function 23 determines whether or not there is a free capacity for allocation of an object, generation of which is requested, in the heap area. If there is a free capacity for allocation of the object, generation of which is requested, in the heap area, the memory management function 23 proceeds to step S15, and allocates the object, generation of which is requested, to the GC-target heap area 200. If there is not a free capacity for allocation of the object, generation of which is requested, in the heap area, the memory management function 23 proceeds to step S13, and executes GC.

In step S14, if a free capacity for allocation of the object, generation of which is requested, is secured through execution of GC, the memory management function 23 proceeds to step S15, and allocates the object, generation of which is requested, to the GC-target heap area 200. If a free capacity for allocation of the object, generation of which is requested, is not secured through execution of GC, the memory management function 23 proceeds to step S16, and triggers an out-of-memory error.

Figure 16:
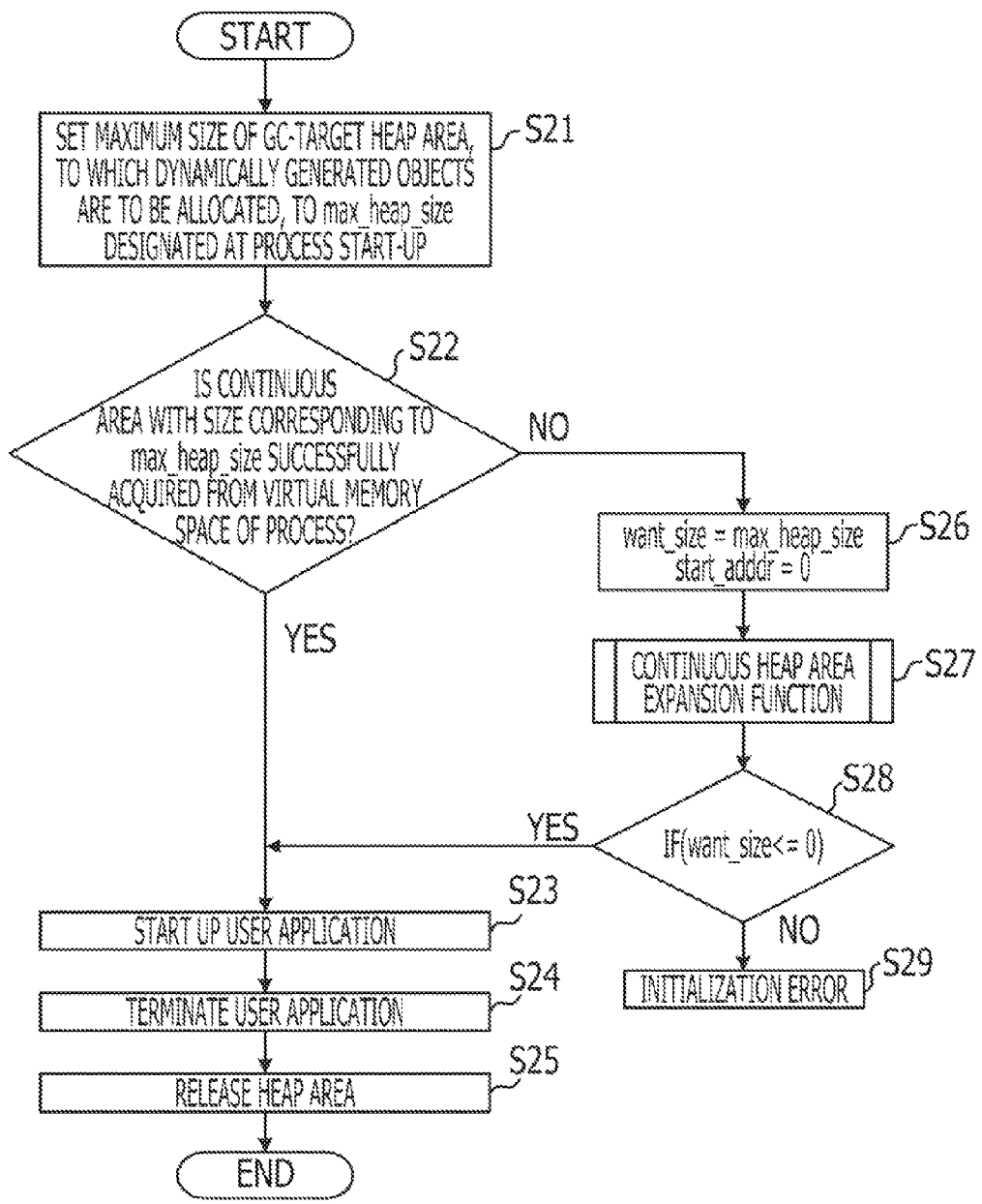
FIG. 16 is a flowchart illustrating a process of acquiring/releasing a heap area according to the embodiment.

FIG. 16 is a flowchart illustrating a process of acquiring/releasing a heap area according to the embodiment. The processes of steps S21 to S25 of FIG. 16 may be substantially the same as the processes of steps S1 to S5 of FIG. 4, and therefore will not be described here.

In step S22, if a continuous area with the maximum heap area size 230 is not acquired from the virtual memory space 50 of the process, the memory management function 23 proceeds to step S26. In step S26, the memory management function 23 substitutes the maximum heap area size (max_heap_size) 230 into management data "want_size". The memory management function 23 also substitutes "0" into management data "start_addr".

The management data "want_size" indicates the size of a heap area that is desired to be newly acquired but that has not been acquired yet. The management data "start_addr" indicates the initial address of the heap area desired to be acquired.

In step S27, the memory management function 23 performs a continuous heap area 130 expansion function to be discussed later in an attempt to acquire a continuous area with the maximum heap area size 230 from the virtual memory space 50 of the process.

In step S28, the memory management function 23 determines whether or not the management data "want_size" has become 0 or less as a result of performing the continuous heap area 130 expansion function in step S27. If the management data "want_size" has become 0 or less, a heap area with the size that is desired to be newly acquired has been acquired, and therefore the memory management function 23 proceeds to step S23.

If the management data "want_size" has not become 0 or less, a heap area with the size that is desired to be newly acquired has not been acquired, and therefore the memory management function 23 proceeds to step S29, and triggers an initialization error.

In the process of acquiring/releasing a heap area according to the embodiment illustrated in FIG. 16, the continuous heap area 130 expansion function is performed in the case where a continuous area with the maximum heap area size 230 is not acquired from the virtual memory space 50 of the process, which makes generation of an initialization error less likely.

Figure 17:
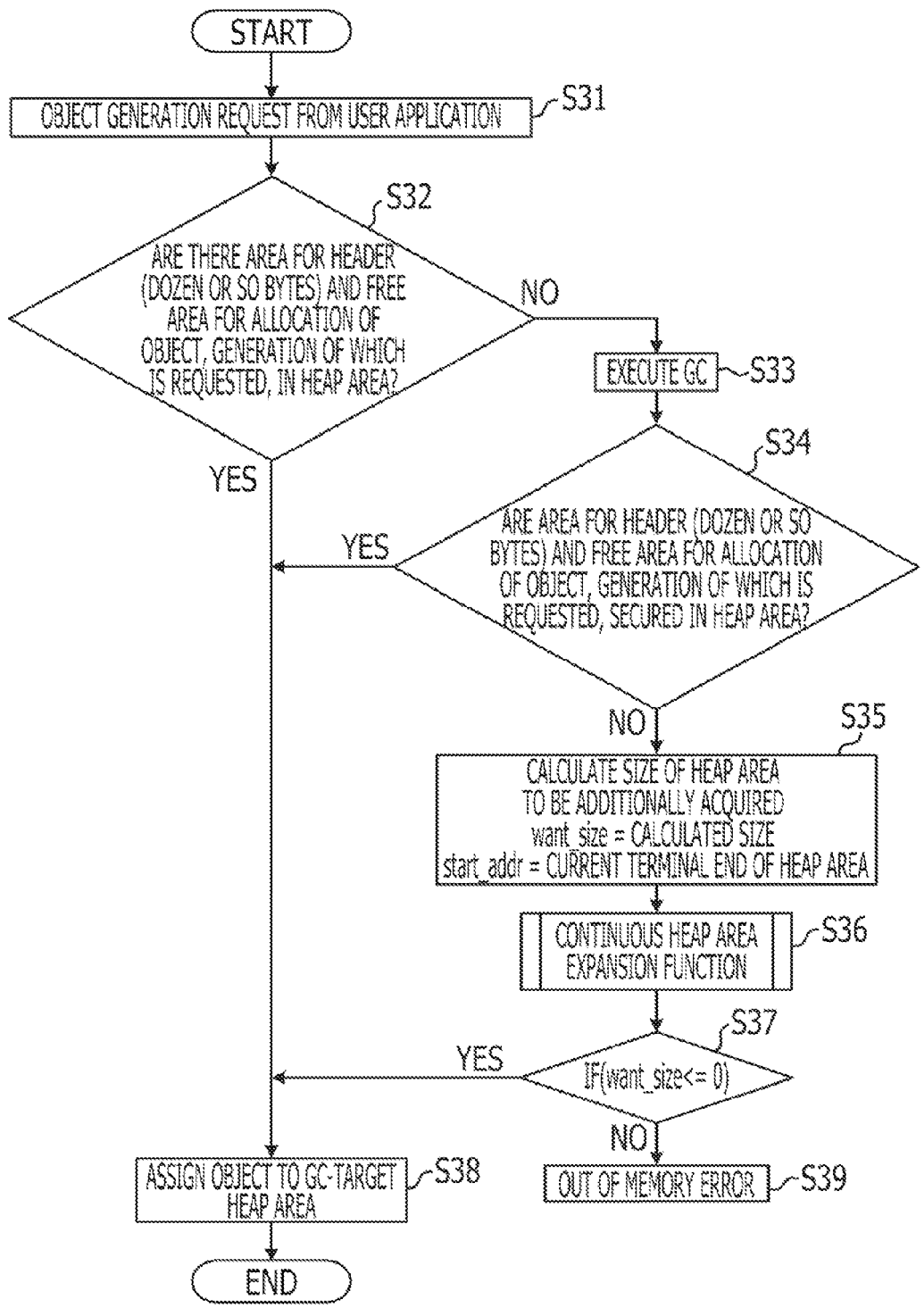
FIG. 17 is a flowchart illustrating a process of an object generation request for a heap area according to the embodiment.

FIG. 17 is a flowchart illustrating a process of an object generation request for a heap area according to the embodiment. In step S31, the memory management function 23 receives an object generation request from the user application 30.

In step S32, the memory management function 23 determines whether or not there is an area for a header (a dozen or so bytes) and a free capacity for allocation of an object, generation of which is requested, in the heap area. If there is an area for the header and a free capacity for allocation of the object, generation of which is requested, in the heap area, memory management function proceeds to step S38, and allocates the object, generation of which is requested, to the GC-target heap area 200.

If there is not an area for the header and a free capacity for allocation of the object, generation of which is requested, in the heap area, the memory management function 23 proceeds to step S33. In step S33, the memory management function 23 executes GC.

In step S34, if an area for the header and a free capacity for allocation of the object, generation of which is requested, are secured through execution of GC, the memory management function 23 proceeds to step S38, and allocates the object, generation of which is requested, to the GC-target heap area 200.

If an area for the header and a free capacity for allocation of the object, generation of which is requested, are not secured through execution of GC, the memory management function 23 proceeds to step S35. In step S35, the memory management function 23 calculates the size of a heap area to be additionally acquired. The memory management function 23 substitutes the size of the heap area to be additionally acquired into the management data "want_size". The memory management function 23 also substitutes the address of the current terminal end of the heap area into the management data "start_addr".

In step S36, the memory management function 23 performs a continuous heap area 130 expansion function to be discussed later in an attempt to acquire a continuous area with the calculated size of the heap area to be additionally acquired from the virtual memory space 50 of the process.

In step S37, the memory management function 23 determines whether or not the management data "want_size" has become 0 or less as a result of performing the continuous heap area 130 expansion function in step S36. If the management data "want_size" has become 0 or less, a heap area with the size that is desired to be newly acquired has been acquired, and therefore the memory management function 23 proceeds to step S38.

If the management data "want_size" has not become 0 or less, a heap area with the size that is desired to be newly acquired has not been acquired, and therefore the memory management function 23 proceeds to step S39, and triggers an out-of-memory error.

In the process of acquiring/releasing a heap area according to the embodiment illustrated in FIG. 17, the continuous heap area 130 expansion function is performed in the case where a free area 120 for allocation an object is not secured in the heap area after execution of GC, which makes generation of an out-of-memory error less likely.

Figure 18:
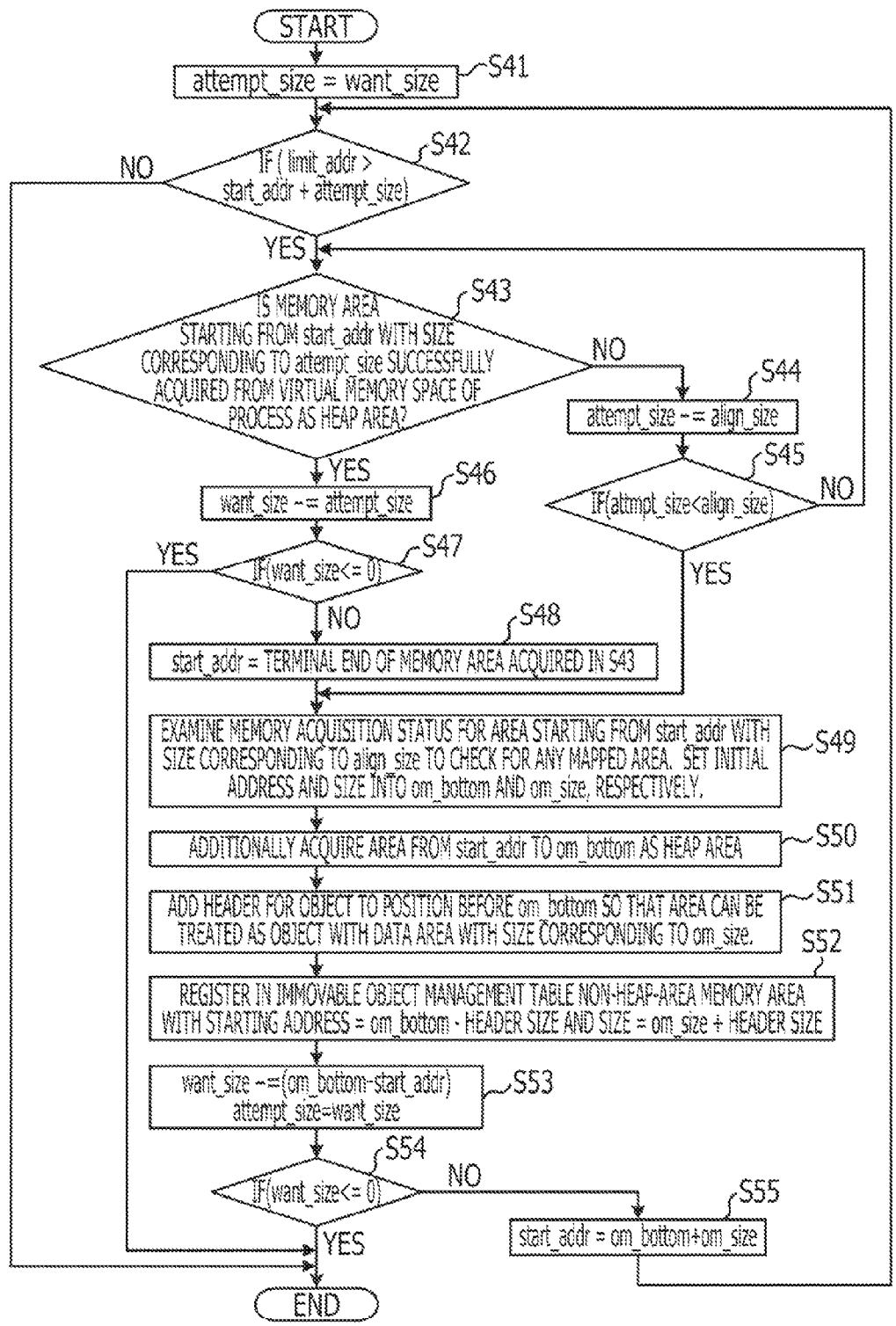
FIG. 18 is a flowchart illustrating a process of a continuous heap area 130 expansion function.

FIG. 18 is a flowchart illustrating a process of the continuous heap area 130 expansion function. In step S41, the memory management function 23 substitutes the value of the management data "want_size" into management data "attempt_size". The management data "attempt_size" indicates the size of a heap area that it is actually attempted to acquire from the virtual memory space 50.

In step S42, the memory management function 23 determines whether or not the address obtained by adding the management data "start_addr" and the management data "attempt_size" is less than the address of management data "limit_addr". The management data "limit_addr" indicates the limit of the address of a heap area that can be acquired from the virtual memory space 50.

If the address obtained by adding the management data "start_addr" and the management data "attempt_size" is less than the address corresponding to the management data "limit_addr", the memory management function 23 proceeds to step S43, and determines whether or not a memory area starting from the management data "start_addr" with a size corresponding to the management data "attempt_size" is successfully acquired from the virtual memory space 50 of the process as a heap area.

If the memory area is successfully acquired in step S43, the memory management function 23 proceeds to step S46, and subtracts the management data "attempt_size" from the management data "want_size". In step S47, the memory management function 23 determines whether or not the management data "want_size" has become 0 or less. If the management data "want_size" has become 0 or less, a heap area with the size that is desired to be newly acquired has been acquired, and therefore the memory management function 23 terminates the process of the flowchart of FIG. 18.

If the management data "want_size" has not become 0 or less, a heap area with the size that is desired to be newly acquired has not been acquired, and therefore the memory management function 23 proceeds to step S48, and substitutes the address of the terminal end of the memory area acquired in step S43 into the management data "start_addr".

After performing the process of step S48, the memory management function 23 proceeds to step S49.

If the memory management function 23 fails in acquiring the memory area in step S43, the memory management function 23 proceeds to step S44, and subtracts management data "align_size" from the management data "attempt_size". The management data "align_size" indicates the alignment size at the time of heap area acquisition. The memory management function 23 adjusts the management data "attempt_size" in accordance with the alignment size. In step S45, the memory management function 23 determines whether or not the management data "attempt_size" is less than the management data "align_size".

If the management data "attempt_size" is not less than the management data "align_size", the memory management function 23 returns to step S43. If the management data "attempt_size" is less than the management data "align_size", the memory management function 23 proceeds to step S49.

In step S49, the memory management function 23 examines the memory acquisition status for an area starting from the address corresponding to the management data "start_addr" with a size corresponding to the management data "align_size" to check for any "non-heap-area memory area 63" mapped on the area starting from the address corresponding to the management data "start_addr" with a size corresponding to the management data "align_size". If there is a "non-heap-area memory area 63" mapped on the area starting from the address corresponding to the management data "start_addr" with a size corresponding to the management data "align_size", the memory management function 23 set the initial address of the "non-heap-area memory area 63" into management data "om_bottom", and substitutes the size of the "non-heap-area memory area 63" into the management data "om_size".

In step S50, the memory management function 23 additionally acquires an area from the address corresponding to the management data "start_addr" to the address corresponding to the management data "om_bottom" as a heap area.

In step S51, the memory management function 23 adds the header 64 for an object at a position before the address corresponding to the management data "om_bottom" so that an area starting from the management data "om_bottom" can be treated as an object with a data area with a size corresponding to the management data "om_size".

In step S52, the memory management function 23 registers an object having a non-heap-area memory area 63 in the immovable object management table illustrated in FIG. 12. In the immovable object management table of FIG. 12, the starting address and the size of the object having a non-heap-area memory area 63 are registered. The starting address is obtained by subtracting the size of the header 64 from the address corresponding to the management data "om_bottom". The size is obtained by adding the size of the header 64 to the size corresponding to the management data "om_size".

In step S53, the memory management function 23 subtracts the size obtained by subtracting the address corresponding to the management data "start_addr" from the address corresponding to the management data "om_bottom", from the management data "want_size". Then, the memory management function 23 substitutes the value of the management data "want_size" into the management data "attempt_size".

In step S54, the memory management function 23 determines whether or not the management data "want_size" has become 0 or less. If the management data "want_size" has become 0 or less, a heap area with the size that is desired to be newly acquired has been acquired, and therefore the memory management function 23 terminates the process of the flowchart of FIG. 18. If the management data "want_size" has not become 0 or less, the memory management function 23 proceeds to step S55, and substitutes the address obtained by adding the size corresponding to the management data "om_size" to the address corresponding to the management data "om_bottom", into the address corresponding to the management data "start_addr". After performing the process of step S55, the memory management function 23 returns to step S43 to continue the process.

In step S42, if the address obtained by adding the management data "start_addr" and the management data "attempt_size" is not less than the address corresponding to the management data "limit_addr", the memory management function 23 cannot acquire a heap area with the size that is desired to be newly acquired, and thus terminates the process of the flowchart of FIG. 18.

A specific example of the process of the flowchart illustrated in FIGS. 17 and 18 will be described below with reference to FIGS. 19 to 22. The heap area is currently positioned at locations 100 to 300. The area at locations 100 to 290 is an object-allocated area 110. The area at locations 290 to 300 is a free area 120 in the heap area. The area at locations 300 to 330 is an area that is usable as a heap area. The area at locations 330 to 350 is a non-heap-area memory area 63. The area at locations 350 to 1000 is an area that is usable as a heap area. Location 1000 is the upper limit of the address usable for the process. The size of a header for an object is "2".

The processes of the flowcharts of FIGS. 17 and 18 will be followed using an exemplary case where the user application 30 provides a request to generate an object with size "20".

In step S31, the memory management function 23 receives a request to generate an object with size "20" from the user application 30. In step S32, the memory management function 23 determines whether or not there is an area for a header (with size 2) and a free capacity for allocation of an object with size "20", generation of which is requested, in the heap area.

Because there is not an area for the header (with size 2) and a free capacity for allocation of the object with size "20", generation of which is requested, in the heap area, the memory management function 23 proceeds to step S33. In step S33, the memory management function 23 executes GC. Here, the description is continued on the assumption that the free capacity cannot be increased.

In step S34, an area for the header (with size 2) and a free capacity for allocation of the object with size 20, generation of which is requested, are not secured through execution of GC, and therefore the memory management function 23 proceeds to step S35. In step S35, the memory management function 23 calculates the size, for example "60", of a heap area to be additionally acquired.

The memory management function 23 substitutes the calculated size "60" of the heap area to be additionally acquired into the management data "want_size". The memory management function 23 also substitutes the "location 300" of the current terminal end of the heap area into the management data "start_addr".

Figure 19:
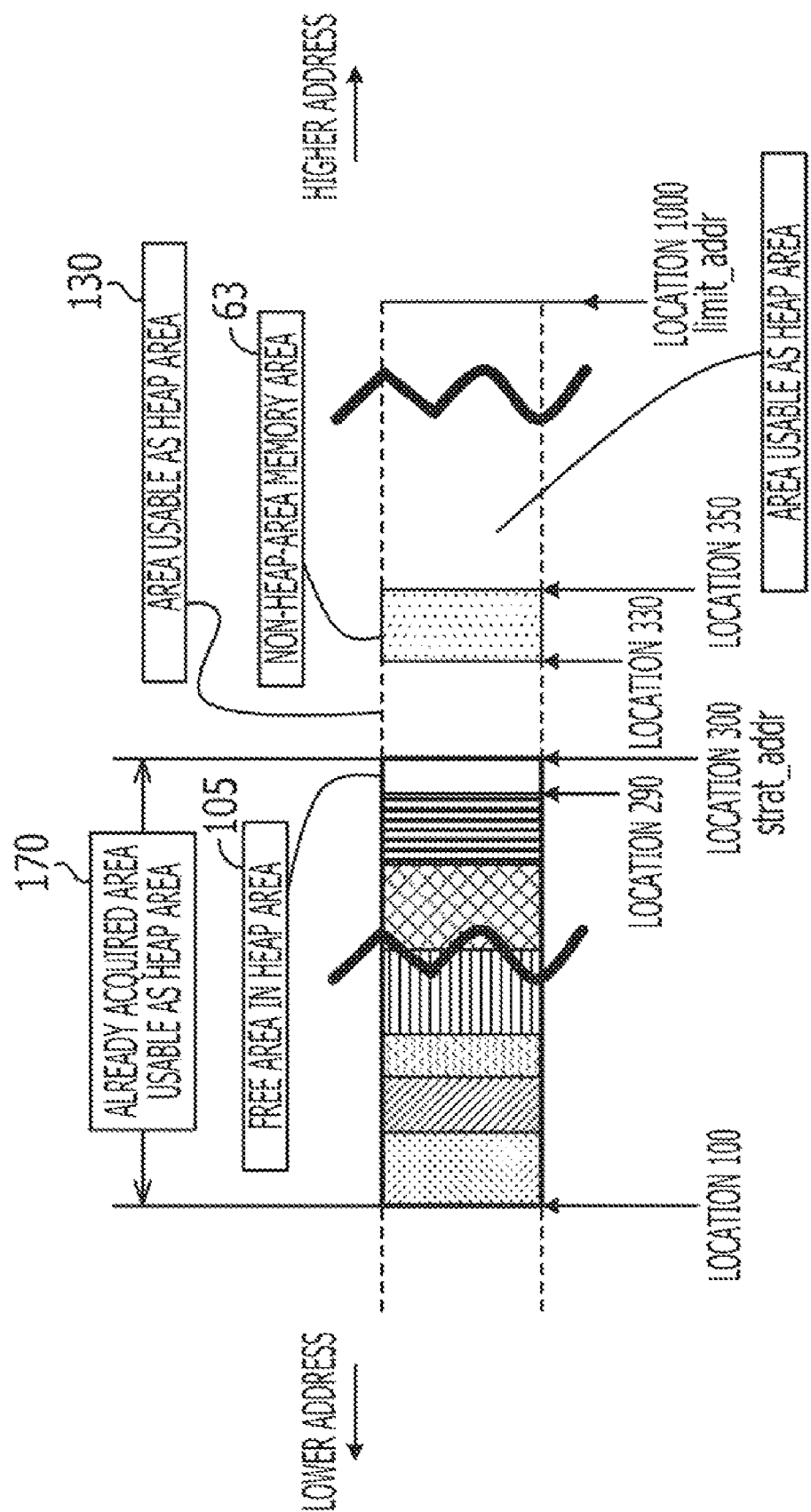
FIG. 19 is a diagram illustrating the configuration around the heap area at the time of termination of the process of step S35.

The configuration around the heap area and the position of each data at the time of termination of the process of step S35 are as illustrated in FIG. 19. FIG. 19 is a diagram illustrating the configuration around the heap area at the time of termination of the process of step S35.

The process of step S36 will be described with reference to the flowchart of FIG. 18. In step S41, the memory management function 23 substitutes the value "60" of the management data "want_size" into the management data "attempt_size".

In step S42, the address "location 360" obtained by adding the value "location 300" of the management data "start_addr" and the value "60" of the management data "attempt_size" is less than the address "location 1000" corresponding to the management data "limit_addr", and therefore the memory management function 23 proceeds to step S43.

In step S43, a non-heap-area memory area 63 is present at locations 330 to 350, and therefore the memory management function 23 fails in acquiring a memory area starting from the value "location 300" of the management data "start_addr" with a size corresponding to the value "60" of the management data "attempt_size", and proceeds to step S44.

In step S44, the memory management function 23 subtracts the value, for example "4", of the management data "align_size" from the value "60" of the management data "attempt_size", and substitutes a new value "56" into the management data "attempt_size".

In step S45, the value "56" of the management data "attempt_size" is not less than the value "4" of the management data "align_size", and therefore the memory management function 23 returns to step S43. The memory management function 23 repeats the processes of steps S43 to S45 until the value of the management data "attempt_size" becomes "28".

In step S43, in spite of the presence of a non-heap-area memory area 63 at locations 330 to 350, the memory management function 23 succeeds in acquiring a memory area starting from the value "location 300" of the management data "start_addr" with a size corresponding to the value "28" of the management data "attempt_size". The memory management function 23 proceeds to step S46, and subtracts the value "28" of the management data "attempt_size" from the value "60" of the management data "want_size", and substitutes a new value "32" into the management data "want_size".

In step S47, the management data "want_size" has not become 0 or less, and therefore the memory management function 23 proceeds to step S48. In step S48, the memory management function 23 substitutes "location 328" as the address of the terminal end of the memory area acquired in step S43 into the management data "start_addr".

In step S49, the memory management function 23 examines the memory acquisition (memory mapping) status for an area starting from the address "location 328" corresponding to the management data "start_addr" with a size corresponding to the value "4" of the management data "align_size" to check for any "non-heap-area memory area 63". With the presence of a "non-heap-area memory area 63", the memory management function 23 substitutes the initial address "location 330" of the "non-heap-area memory area 63" into the management data "om_bottom", and substitutes the size "20" of the "non-heap-area memory area 63" into the management data "om_size".

Figure 20:
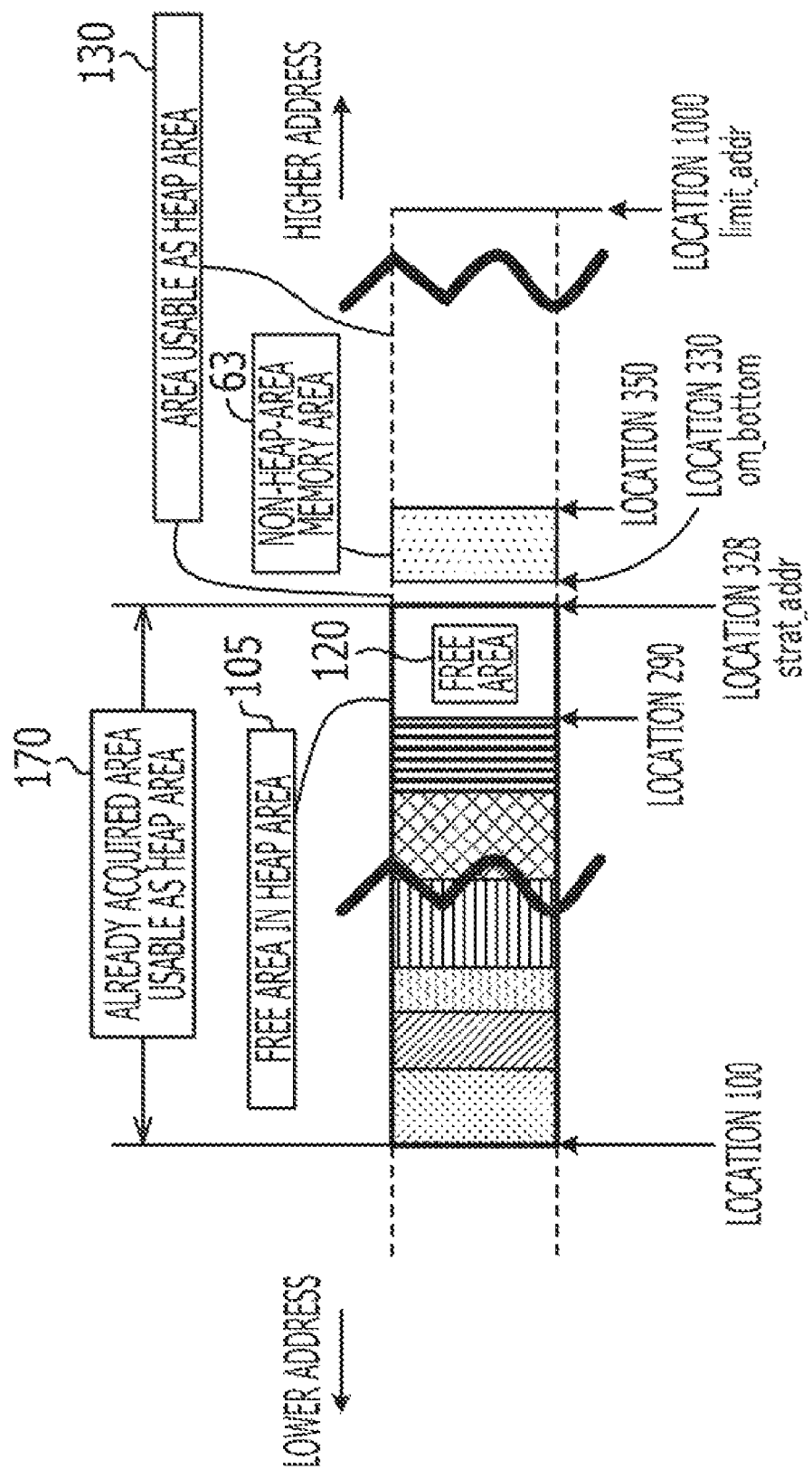
FIG. 20 is a diagram illustrating the configuration around the heap area at the time of termination of the process of step S49.

The configuration around the heap area and the position of each data at the time of termination of the process of step S49 are as illustrated in FIG. 20. FIG. 20 is a diagram illustrating the configuration around the heap area at the time of termination of the process of step S49.

In step S50, the memory management function 23 additionally acquires an area from the address "location 328" corresponding to the management data "start_addr" to the address "location 330" corresponding to the management data "om_bottom" as a heap area.

In step S51, the memory management function 23 adds the header 64 for an object with size "2" at a position before the address "location 330" corresponding to the management data "om_bottom" so that an area at locations 328 to 350 can be treated as a single object.

In step S52, the memory management function 23 registers a non-heap-area memory area 63 with starting address "location 328" and size "22" in the immovable object management table illustrated in FIG. 12.

In step S53, the memory management function 23 subtracts the size "2" obtained by subtracting the address "location 328" corresponding to the management data "start_addr" from the address "location 330" corresponding to the management data "om_bottom", from the value "32" of the management data "want_size". The memory management function 23 substitutes the value "30" of the management data "want_size" into the management data "attempt_size".

In step S54, the management data "want_size" has not become 0 or less, and therefore the memory management function 23 proceeds to step S55, and substitutes the address "location 350" obtained by adding the size "20" corresponding to the management data "om_size" to the address "location 330" corresponding to the management data "om_bottom", into the address corresponding to the management data "start_addr". After performing the process of step S55, the memory management function 23 returns to the process of step S42.

Figure 21:
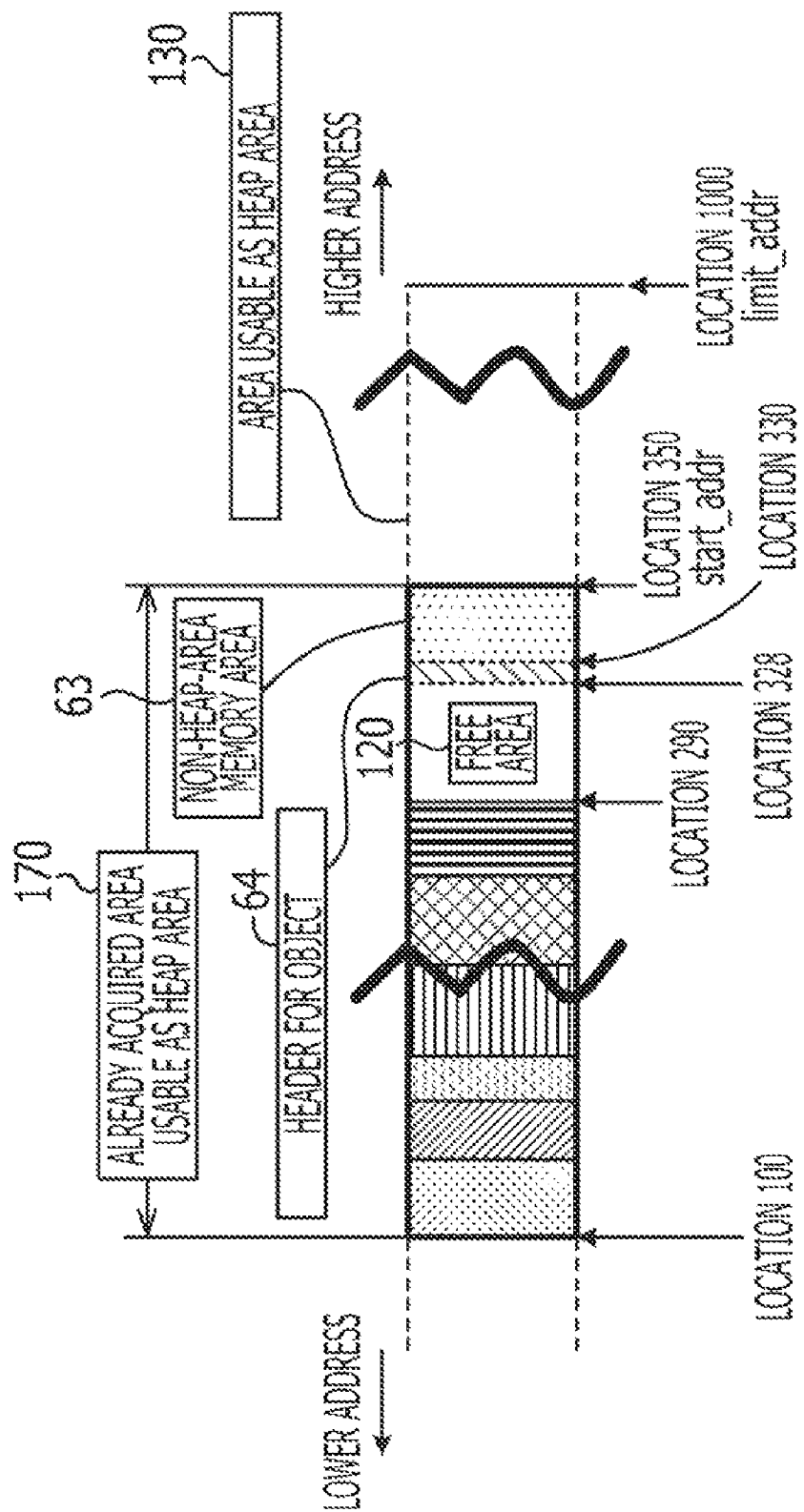
FIG. 21 is a diagram illustrating the configuration around the heap area at the time of termination of the process of step S55.

The configuration around the heap area and the position of each data at the time of termination of the process of step S55 are as illustrated in FIG. 21. FIG. 21 is a diagram illustrating the configuration around the heap area at the time of termination of the process of step S55.

In step S43, the memory management function 23 succeeds in acquiring a memory area starting from the value "location 350" of the management data "start_addr" with a size corresponding to the value "30" of the management data "attempt_size", and proceeds to step S46.

The memory management function 23 proceeds to step S46, and subtracts the value "30" of the management data "attempt_size" from the value "30" of the management data "want_size", and substitutes a new value "0" into the management data "want_size". In step S47, the management data "want_size" has become 0 or less, and therefore the memory management function 23 terminates the process of the flowchart of FIG. 18, in other words the process of step S36 of FIG. 17.

Figure 22:
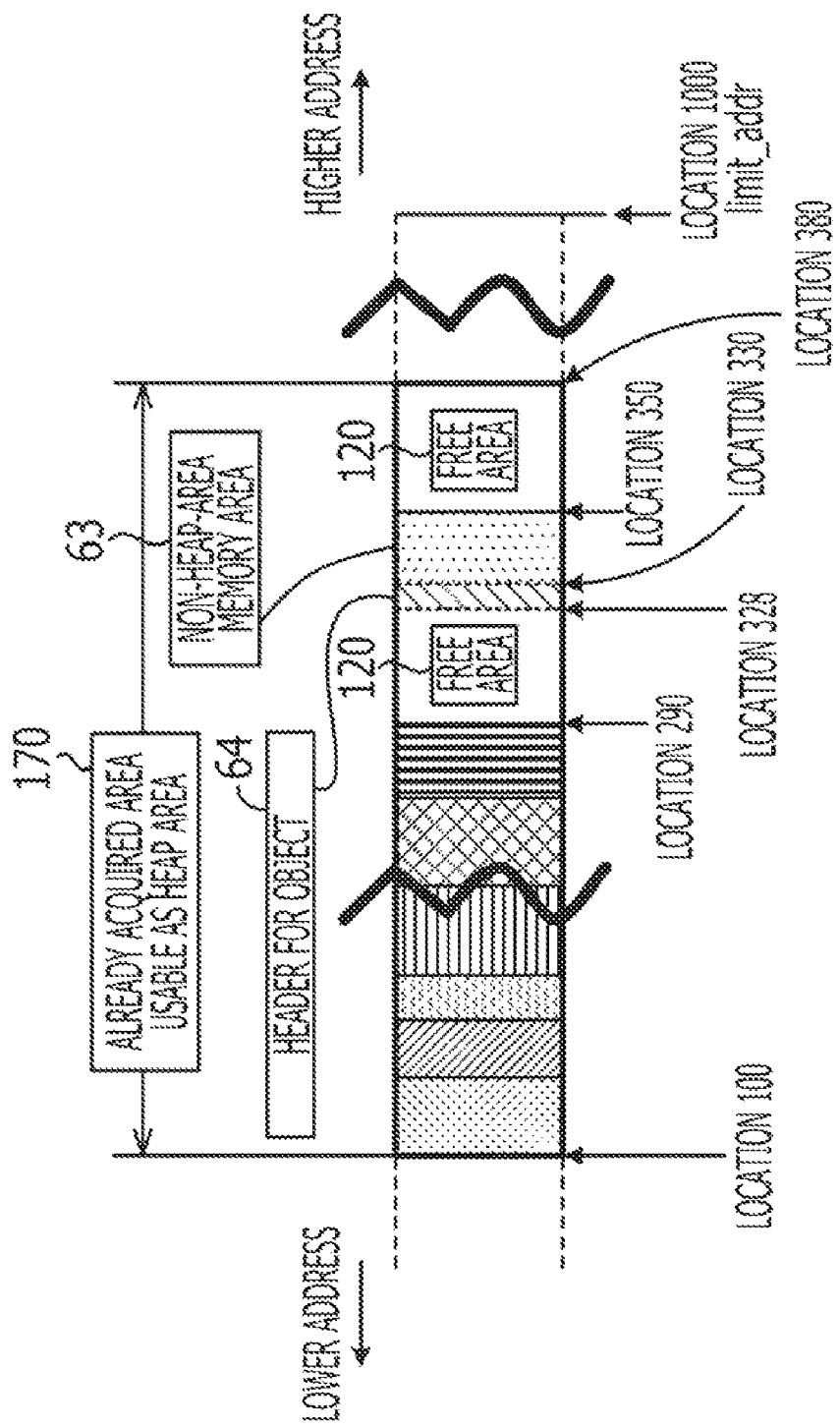
FIG. 22 is a diagram illustrating the configuration around the heap area at the time of termination of the process of step S37.

In step S37, the management data "want_size" has become 0 or less, and therefore the memory management function 23 proceeds to step S38. The configuration around the heap area and the position of each data at the time of termination of the process of step S37 are as illustrated in FIG. 22. FIG. 22 is a diagram illustrating the configuration around the heap area at the time of termination of the process of step S37.

In step S38, the memory management function 23 can allocate the object with size "20", generation of which is requested by the user application 30, to the area at "locations 290 to 310" including the newly acquired free area 120, and at the same time, the area at "locations 310 to 328" and the area at "locations 330 to 350" are also usable as heap areas.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A non-transitory computer readable recording medium storing a memory management program causing a computer to execute:
managing a memory area including:
adding a header for an object to the memory area other than a heap-area to treat the memory area as a mock object, and
treating a plurality of heap areas divided by the memory area as a single continuous heap area.

2. The recording medium according to claim 1, further comprising
adding a header for the object to the memory area when the heap area with a designated maximum size is not acquired due to a presence of the memory area other than heap-area.

3. The recording medium according to claim 1, further comprising dynamically allocates the object to the heap area.

4. The recording medium according to claim 3, further comprising
releasing a portion of the object dynamically allocated to the heap area that is not used.

5. The recording medium according to claim 3, further comprising collecting portions of the object dynamically allocated to the heap area that are being used to generate a continuous free area in the heap area when an object is dynamically allocated to the heap area to leave no free area in the heap area.

6. The recording medium according to claim 4, further comprising
referencing a table for management of the mock object not to move the mock object when collecting portions of the object dynamically allocated to the heap area that are being used.

7. A memory management apparatus comprising:
a memory including a memory area serving as a heap area and a non-heap-area memory area; and
a processor to add a header for an object to a memory area other than heap-area to treat the non-heap-area memory area as a mock object in order to treat a plurality of heap areas divided by the non-heap-area memory area as a single continuous heap area.

8. The memory management apparatus according to claim 7, wherein the processor dynamically allocates the object to the heap area.

9. The memory management apparatus according to claim 8, wherein the processor releases a portion of the object dynamically allocated to the heap area that is not used.

10. The memory management apparatus according to claim 8, wherein the processor collects portions of the object dynamically allocated to the heap area that are being used to generate a continuous free area in the heap area when an object is dynamically allocated to the heap area to leave no free area in the heap area.

* * * * *